(12) United States Patent
Shin

(10) Patent No.: US 10,061,488 B2
(45) Date of Patent: Aug. 28, 2018

(54) MEDICAL IMAGING APPARATUS AND METHOD OF DISPLAYING USER INTERFACE IMAGE

(71) Applicant: SAMSUNG ELECTRONIC CO., LTD., Suwon-si (KR)

(72) Inventor: Jong-hyun Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 549 days.

(21) Appl. No.: 14/668,206

(22) Filed: Mar. 25, 2015

(65) Prior Publication Data

US 2015/0281564 A1    Oct. 1, 2015

(30) Foreign Application Priority Data

Mar. 26, 2014 (KR) ........................ 10-2014-0035374

(51) Int. Cl.
 G06F 3/0484 (2013.01)
 H04N 5/232 (2006.01)
 H04N 5/32 (2006.01)

(52) U.S. Cl.
 CPC ...... *G06F 3/04842* (2013.01); *G06F 3/04847* (2013.01); *H04N 5/23245* (2013.01); *H04N 5/23293* (2013.01); *H04N 5/32* (2013.01)

(58) Field of Classification Search
 CPC ............ A61M 2205/502; G06F 19/322; G06F 19/3406; G06F 19/321; G06F 17/212; G06F 19/3418; G06F 3/04847; G06F 3/0488; G06F 3/017; G06F 17/30247; G06F 8/34; G06F 3/04842; G01R 33/543; G01R 33/546; A61B 8/465; H04N 5/23245; H04N 5/23293; H04N 5/32; H04N 5/23216
 See application file for complete search history.

(56) References Cited

U.S. PATENT DOCUMENTS

| 6,907,102 | B1 * | 6/2005 | Sauer ..................... A61B 6/032 |
| | | | 378/19 |
| 8,994,966 | B2 | 3/2015 | Bae et al. |
| 9,665,264 | B1 * | 5/2017 | Janiak .................. G06F 3/0486 |

(Continued)

FOREIGN PATENT DOCUMENTS

| JP | 2009-268731 A | 11/2009 |
| JP | 2010-198295 A | 9/2010 |

(Continued)

OTHER PUBLICATIONS

Communication dated Jul. 29, 2016, issued by the Korean Intellectual Property Office in counterpart Korean Application No. 10-2014-0035374.

(Continued)

*Primary Examiner* — Tadeese Hailu
(74) *Attorney, Agent, or Firm* — Sughrue Mion, PLLC

(57) ABSTRACT

A medical imaging apparatus includes a controller which generates a user interface (UI) image, a display which displays the UI image, and a UI device which receives an input which relates to the UI image. The UI image may include a first tab which includes a plurality of first parameter sets which respectively correspond to a plurality of imaging modes, and a second tab which includes a second parameter set which corresponds to an imaging mode selected from among the plurality of imaging modes.

37 Claims, 33 Drawing Sheets

(56) References Cited

U.S. PATENT DOCUMENTS

| | | | | |
|---|---|---|---|---|
| 2002/0173721 | A1* | 11/2002 | Grunwald | A61B 8/00 600/437 |
| 2003/0016850 | A1* | 1/2003 | Kaufman | G06F 19/321 382/128 |
| 2003/0095144 | A1* | 5/2003 | Trevino | A61B 5/055 715/764 |
| 2004/0242988 | A1 | 12/2004 | Niwa et al. | |
| 2008/0126982 | A1* | 5/2008 | Sadikali | G06F 19/321 715/810 |
| 2011/0252446 | A1 | 10/2011 | Jeong et al. | |
| 2013/0211240 | A1* | 8/2013 | Kitane | A61B 5/743 600/420 |
| 2014/0275819 | A1* | 9/2014 | Kassem | A61B 5/743 600/301 |
| 2015/0248534 | A1* | 9/2015 | Krzywicki | G06F 19/3406 715/771 |

FOREIGN PATENT DOCUMENTS

| | | |
|---|---|---|
| KR | 10-0276694 B1 | 1/2001 |
| KR | 10-2006-0107945 A | 10/2006 |
| KR | 10-1003506 B1 | 12/2010 |
| KR | 10-2012-0089122 A | 8/2012 |

OTHER PUBLICATIONS

Communication dated Sep. 28, 2016, issued by the Korean Intellectual Property Office in counterpart Korean Application No. 10-2014-0035374.

Communication dated Oct. 31, 2015, issued by the Korean Intellectual Property Office in counterpart Korean Application No. 10-2014-0035374.

* cited by examiner

FIG. 7B

| Summary | Scan | Recon | Auto Tasking | Trigger |
|---|---|---|---|---|
| CTDIvol (mGy) Expected : 19.00 Measured : 00.00 | | DLP (mGy.cm) Expected : 21.00 Measured : 00.00 | | |

| Scan Type | kV | mA | Delay | Start Location | End Location | Scout Length |
|---|---|---|---|---|---|---|
| Axial ▶ | 120 kv ▶ | 40 mA ▶ | 10s | −500mm | 300mm | 400 mm |

| Indicator Timer | Collimation | Speed | Lower mA limit | Rotation Speed | No. of Images | Rotation Time |
|---|---|---|---|---|---|---|
| 10 | 0.625 mm | 80 mm/s | 25 % | 0.5 | 1 | 0.3 s |

| Pitch | | | | | | |
|---|---|---|---|---|---|---|
| 10 | | | | | | |

| Total scan time 01:20 | Scout 00:10 | Delay 10s | Scan 00:10 | Delay 10s | Scan 00:10 | Contrast | Delay 10s |

FIG. 8A

| Scan | | | | Recon | | Auto Tasking | | | Trigger | |
|---|---|---|---|---|---|---|---|---|---|---|
| Scan Type | kV | mA | Delay (s) | Pitch | Start Location (mm) | End Location (mm) | Rotation Time (s) | CTDIvol (mGy) | DLP (mGy·cm) |
| AP ▶ | 120 ▶ | 40 ▶ | 0 | 10 | −500 | 300 | 0.3 | E: 19.00 M: 19.00 | E: 21.00 M: 21.00 |
| Axial ▶ | 120 ▶ | 40 ▶ | 10 | 10 | −500 | 300 | 0.3 | E: 19.00 M: – | E: 21.00 M: – |
| Axial ▶ | 120 ▶ | 40 ▶ | 10 | 10 | −500 | 300 | 0.3 | E: 19.00 M: – | E: 21.00 M: – |
| | | | | | | | | | |

Total scan time 01:20

Scout 00:10 | Delay 10s | Scan 00:10 | Delay 10s | Scan 00:10 | Contrast | Delay 10s 800, 820, 830 — Detail View

FIG. 8B

| Scan ▣ Detail View | Recon | Auto Tasking | Trigger |
|---|---|---|---|
| CTDIvol (mGy) Expected : 19.00 Measured : 00.00 | DLP (mGy.cm) Expected : 21.00 Measured : 00.00 | | |

| ✓ Scan Type | ✓ kV | ✓ mA | ✓ Delay | ✓ Start Location | ✓ End Location | Scout Length |
| Axial ▶ | 120 kv ▶ | 40 mA ▶ | 10s | -500mm | 300mm | 400 mm |

| Indicator Timer | Collimation | Speed | Lower mA limit | Rotation Speed | No. of Images | ✓ Rotation Time |
| 10 | 0.625 mm | 80 mm/s | 25 % | 0.5 | 1 | 0.3 s |

| ✓ Pitch |
| 10 |

810 ─
830 ─

| Total scan time | Scout | Delay 10s | Scan | Delay 10s | Scan | Contrast | Delay 10s |
| 01:20 | 00:10 | | 00:10 | | 00:10 | | |

FIG. 9C

| Summary | | Scan | | | Recon | | Auto Tasking | | Trigger | |
|---|---|---|---|---|---|---|---|---|---|---|
| Scan Type | kV | mA | Delay (s) | Pitch | Start Location (mm) | End Location (mm) | Rotation Time (s) | | CTDIvol (mGy) | DLP (mGy*cm) |
| Axial ▶ | 120 ▶ | 40 ▶ | 10 | 10 | −500 | 300 | 0.3 | | E: 19.00 M: — | E: 21.00 M: — |
| AP ▶ | 120 ▶ | 40 ▶ | 0 | 10 | −500 | 300 | 0.3 | | E: 19.00 M: 19.00 | E: 21.00 M: 21.00 |
| Axial ▶ | 120 ▶ | 40 ▶ | | 10 | −500 | 300 | 0.3 | | E: 19.00 M: — | E: 21.00 M: — |
| | | | | | | | | | | |

Total scan time 01:20 | Scan 00:10 | Delay 10s | Scout 00:10 | Delay 10s | Scan 00:10 | Contrast | Delay 10s

FIG. 10A

| | Summary | Scan | Recon | Auto Tasking | Trigger |
|---|---|---|---|---|---|
| | CTDIvol (mGy) Expected : 19.00 Measured : 00.00 | DLP (mGy·cm) Expected : 21.00 Measured : 00.00 | | | |

| Scan Type | kV | mA | Delay | Start Location | End Location | Scout Length |
|---|---|---|---|---|---|---|
| Axial | 120 k | 40 mA ▶ | 10s | −500mm | 300mm | 400 mm |

| Indicator Timer | Collimation | /s | Lower mA limit | Rotation Speed | No. of Images | Rotation Time |
|---|---|---|---|---|---|---|
| 10 | 0.625 mm | | 25 % | 0.5 | 1 | 0.3 s |

| Pitch | | | | | | |
|---|---|---|---|---|---|---|
| 10 | | | | | | |

| Total scan time | Scout | Delay 10s | Scan | Delay 10s | Scan | Contrast | Delay 10s |
|---|---|---|---|---|---|---|---|
| 01:20 | 00:10 | | 00:10 | | 00:10 | | |

| Summary | Scan | Recon | Auto Tasking | Trigger |

CTDIvol (mGy) Expected : 19.00 Measured : 00.00 | DLP (mGy.cm) Expected : 21.00 Measured : 00.00

| Scan Type | kV | mA | Delay | Start Location | End Location | Scout Length |
|---|---|---|---|---|---|---|
| Axial | 120 kV ▶ | 40 mA ▶ | 0s | -500mm | 300mm | 400 mm |

| Indicator Timer | Collimation | Speed | Lower mA limit | Rotation Speed | No. of Images | Rotation Time |
|---|---|---|---|---|---|---|
| 10 | 0.625 mm | 80 mm/s | 25 % | 0.5 | 1 | 0.3 s |

| Pitch |
|---|
| 10 |

1130 (circled around mA dropdown)

| Total scan time 01:20 | Scout 00:10 | Delay 10s | Scan 00:10 | Delay 10s | Scan 00:10 | Contrast | Delay 10s |

FIG. 12A

| Summary | | Scan | | Recon | | Auto Tasking | | Trigger | |
|---|---|---|---|---|---|---|---|---|---|
| Scan Type | kV | mA | Delay (s) | Pitch | Start Location (mm) | End Location (mm) | Rotation Time (s) | CTDIvol (mGy) | DLP (mGy*cm) |
| AP ▶ | 120 ▶ | 40 ▶ | 0 | 10 | −500 | 300 | 0.3 | E: 19.00 M: 19.00 | E: 21.00 M: 21.00 |
| Axial ▶ | 120 ▶ | 40 ▶ | 10 | 10 | −500 | 300 | 0.3 | E: 19.00 M: – | E: 21.00 M: – |
| Axial ▶ | 120 ▶ | | 10 | 10 | −500 | 300 | 0.3 | E: 19.00 M: – | E: 21.00 M: – |
| | | | | | | | | | |

1210

Total scan time 01:20 | Scout 00:10 | Delay 10s | Scan 00:10 | Delay 10s | Scan 00:10 | Contrast | Delay 10s

| | Summary | Scan | Recon | Auto Tasking | Trigger |
|---|---|---|---|---|---|
| | CTDIvol (mGy) | Expected: 19.00 Measured: 00.00 | DLP (mGy.cm) | Expected: 21.00 Measured: 00.00 | |

| Scan Type | kV | mA | Delay | Start Location | End Location | Scout Length |
|---|---|---|---|---|---|---|
| AP ▸ | 200 kV ▾ | 40 mA ▸ | 0s | −500mm | 300mm | 400 mm |

| Indicator Timer | Collimation | Speed | Lower mA limit | Rotation Speed | No. of Images | Rotation Time |
|---|---|---|---|---|---|---|
| 10 | 0.625 mm | 80 mm/s | 25 % | 0.5 | 1 | 0.3 s |

| Pitch |
|---|
| 10 |

1230 → (200 kV highlighted)

| Total scan time | Scout | Delay 10s | Scan | Delay 10s | Scan | Contrast | Delay 10s |
|---|---|---|---|---|---|---|---|
| 01:20 | 00:10 | | 00:10 | | 00:10 | | |

| Summary | | Scan | | Recon | | Auto Tasking | | Trigger | |
|---|---|---|---|---|---|---|---|---|---|
| Scan Type | kV | mA | Delay (s) | Pitch | Start Location (mm) | End Location (mm) | Rotation Time (s) | CTDIvol (mGy) | DLP (mGy*cm) |
| AP ▶ | 120 ▶ | 40 ▶ | 0 | 10 | −500 | 300 | 0.3 | E: 19.00 M: 19.00 | E: 21.00 M: 21.00 |
| Axial ▶ | 200 ▶ | 40 ▶ | 10 | 10 | −500 | 300 | 0.3 | E: 19.00 M: − | E: 21.00 M: − |
| Axial ▶ | 120 ▶ | 40 ▶ | 10 | 10 | −500 | 300 | 0.3 | E: 19.00 M: − | E: 21.00 M: − |

1330

Total scan time 01:20 | Scout 00:10 | Delay 10s | Scan 00:10 | Delay 10s | Scan 00:10 | Contrast | Delay 10s

FIG. 14C

| | Summary | Scan | Recon | Auto Tasking | Trigger |
|---|---|---|---|---|---|
| | CTDIvol (mGy) | Expected : 19.00 Measured : 20.00 | DLP (mGy.cm) | Expected : 21.00 Measured : 22.00 | |

| Scan Type | kV | mA | Delay | Start Location | End Location | Scout Length |
|---|---|---|---|---|---|---|
| ▽ Axial ▶ | ▽ 120 kv ▶ | ▽ 40 mA ▶ | ▽ 0s | ▽ Start Location −500mm | ▽ 300mm | 400 mm |

| Indicator Timer | Collimation | Speed | Lower mA limit | Rotation Speed | No. of Images | ▽ Rotation Time |
|---|---|---|---|---|---|---|
| 10 | 0.625 mm | 80 mm/s | 25 % | 0.5 | 1 | 0.3 s |

| ▽ Pitch |
|---|
| 10 |

1400 — kV box (120 kv)
1410 — mA box (40 mA)

| Total scan time 01:20 | Scout 00:10 | Delay 10s | Scan 00:10 | Delay 10s | Scan 00:10 | Contrast | Delay 10s |

FIG. 15A

| Summary | | Scan | | Recon | | Auto Tasking | | Trigger | |
|---|---|---|---|---|---|---|---|---|---|
| Scan Type | kV | mA | Delay (s) | Pitch | Start Location (mm) | End Location (mm) | Rotation Time (s) | CTDIvol (mGy) | DLP (mGy*cm) |
| AP ▶ | 120 ▶ | 40 ▶ | 0 | | | | | | |
| Axial ▶ | 120 ▶ | 40 ▶ | 10 | 10 | -500 | 300 | 0.3 | E: 19.00 M: 19.00 | E: 21.00 M: 21.00 |
| Axial ▶ | 120 ▶ | 40 ▶ | 10 | 10 | -500 | 300 | 0.3 | E: 19.00 M: – | E: 21.00 M: – |
| | | | | 10 | -500 | 300 | 0.3 | E: 19.00 M: – | E: 21.00 M: – |

Total scan time 01:20 | Scout 00:10 | Delay 10s | Scan 00:10 | Delay 10s | Scan 00:10 | Contrast | Delay 10s

| Summary | Scan | Recon | Auto Tasking | Trigger |
|---|---|---|---|---|

CTDIvol (mGy) Expected : 19.00 Measured : 00.00 | DLP (mGy.cm) Expected : 21.00 Measured : 00.00

| Scan Type | kV | mA | Delay | Start Location | End Location | Scout Length |
|---|---|---|---|---|---|---|
| Axial | 120 kV ▸ | 40 mA ▸ | 10s | -500mm | 300mm | 400 mm |

| Indicator Timer | Collimation | Speed | Lower mA limit | Rotation Speed | No. of Images | Rotation Time |
|---|---|---|---|---|---|---|
| 10 | 0.625 mm | 80 mm/s | 25 % | 0.5 | 1 | 0.3 s |

| Pitch |
|---|
| 10 |

1520

| Total scan time 01:20 | Scout 00:10 | Delay 10s | Scan 00:10 | Delay 10s | Scan 00:10 | Contrast | Delay 10s |

MEDICAL IMAGING APPARATUS AND METHOD OF DISPLAYING USER INTERFACE IMAGE

RELATED APPLICATIONS

This application claims priority from Korean Patent Application No. 10-2014-0035374, filed on Mar. 26, 2014, in the Korean Intellectual Property Office, the disclosure of which is incorporated herein by reference in its entirety.

BACKGROUND

1. Field

One or more exemplary embodiments relate to a medical imaging apparatus which displays a user interface (UI) image which includes a parameter set.

2. Description of the Related Art

Medical imaging apparatuses are equipment configured for acquiring an internal structure of an object as an image. Medical imaging apparatuses are noninvasive examination apparatuses that capture images of the structural details of a human body, internal tissue thereof, and fluid flow within a human body, process the images, and show the processed images to a user. A user such as a doctor may diagnose a health state and a disease of a patient by using a medical image output from a medical imaging apparatus.

Examples of the medical imaging apparatus include a computed tomography (CT) apparatus, a magnetic resonance imaging (MRI) apparatus for providing a magnetic resonance (MR) image, an X-ray apparatus, and an ultrasound diagnostic apparatus.

CT apparatuses are capable of providing a cross-sectional image of an object and distinctively expressing inner structures (e.g., organs such as a kidney, a lung, etc.) of the object, as compared with general X-ray apparatuses. Thus, CT apparatuses are widely used for accurately diagnosing a disease.

The CT apparatus irradiates an X-ray toward the object, detects the X-ray that has propagated through the object, and then restores an image by using the detected X-ray.

MRI apparatuses are apparatuses configured for photographing a subject by using a magnetic field, and are widely used to accurately diagnose a disease, because the MRI apparatuses three-dimensionally show not only bones, but also discs, joints, nerves, and ligaments in a desired angle.

The MRI apparatus obtains an MR signal by using a permanent magnet, a gradient coil, and a high frequency multi-coil which includes radio frequency (RF) coils. Then, the MRI apparatus samples the MR signal in order to restore the MR image.

To diagnose a patient, a doctor acquires a medical image by scanning an object by using a medical imaging apparatus. In this case, to scan an object, a user such as a doctor needs to set an imaging mode of the medical imaging apparatus, various parameters for use in the imaging mode, and a body part which is to be scanned and a region of interest of the body part. Accordingly, the medical imaging apparatus may output a user interface (UI) image for performing the above-described setting, and the user may recognize, input, or change settings necessary for scanning the object via the output UI image.

Therefore, it would be advantageous if the medical imaging apparatus could provide a UI image which would enable the user to conveniently perform the above-described setting so that the user could more conveniently capture a medical image.

SUMMARY

One or more exemplary embodiments include a medical imaging apparatus which enables a user to easily and conveniently capture a medical image, and a method for displaying a user interface (UI) image which is performable by the medical imaging apparatus.

Additional aspects will be set forth in part in the description which follows and, in part, will be apparent from the description, or may be learned by practice of the presented exemplary embodiments.

According to one or more exemplary embodiments, a medical imaging apparatus includes a controller configured to generate a user interface (UI) image; a display configured to display the UI image; and a UI device configured to receive an input which relates to the UI image. The UI image includes a first tab which includes a plurality of first parameter sets which respectively correspond to a plurality of imaging modes, and a second tab which includes a second parameter set which corresponds to an imaging mode selected from among the plurality of imaging modes.

The UI image may include a menu image that includes at least the first tab and the second tab, and the menu image may be switchable between respective contents of at least the first tab and the second tab.

The UI device may be further configured receive a first input which relates to changing an arrangement of the plurality of first parameter sets within the first tab, and the controller may be further configured to generate the UI image by changing the arrangement of the plurality of first parameter sets based on the received first input.

The UI device may be further configured receive a second input which relates to changing a layout of the second parameter set within the second tab, and the controller may be further configured to generate the UI image by changing the layout of the second parameter set based on the received second input.

The UI device may be further configured to receive a third input which relates to selecting at least one parameter from the second parameter set, and the controller may be further configured to generate the UI image by including the selected at least one parameter in the plurality of first parameter sets based on the received third input.

The UI device may be further configured to receive a fourth input which relates to changing a value of at least one parameter included in the plurality of first parameter sets within the first tab, and the controller may be further configured generate the UI image such that the at least one parameter having a changed value is distinguished from a parameter having a value which has not been changed in the plurality of first parameter sets based on the received fourth input.

The controller may be further configured to change a value of a parameter of the second parameter set that corresponds to the at least one parameter having a changed value, and to generate the UI image such that the parameter having a changed value in the second parameter set is distinguished from a parameter having a value which has not been changed in the second parameter set.

The UI device may be further configured to receive a fifth input which relates to changing a value of at least one parameter included in the second parameter set within the second tab, and the controller may be further configured to generate the UI image such that the at least one parameter having a changed value in the second parameter set is distinguished from a parameter having a value which has not been changed in the second parameter set based on the received fifth input.

The controller may be further configured to change a value of a parameter of the plurality of first parameter sets that corresponds to the at least one parameter having a changed value in the second parameter set, and to generate the UI image such that the parameter having a changed value in the plurality of first parameter sets is distinguished from a parameter having a value which has not been changed in the plurality of first parameter sets.

At least one of the first tab and the second tab may further include a measured value of at least one of a radiation amount and a specific absorption rate generated during a medical image capturing operation in each of the plurality of imaging modes.

At least one of the first tab and the second tab may further include an expected value of at least one of the radiation amount and the specific absorption rate generated during the medical image capturing operation in each of the plurality of imaging modes.

The controller may be further configured to compare the measured value with the expected value, and, when the measured value exceeds the expected value, to control the display to display a notification signal which indicates a corresponding amount of excess.

The medical imaging apparatus may further comprise a speaker configured to output a notification sound which corresponds to the notification signal.

For each of the plurality of imaging modes, the controller may be further configured to compare the measured value with the expected value. When the measured value exceeds the expected value, the controller may be further configured to control the display to display the UI image such that a parameter which affects the measured value is distinguished from a parameter which does not affect the measured value in at least one of the first tab and the second tab.

In the UI image, changeable parameters of at least one of the first tab and the second tab may be distinguished from unchangeable parameters based on the received input.

The plurality of imaging modes may comprise at least one of a computed tomography (CT) imaging mode which is classified based on at least one region of an object and a sub-imaging mode included in the CT imaging mode. The plurality of imaging modes may comprise at least one of a magnetic resonance imaging (MRI) imaging mode which is classified based on at least one region of an object and a sub-imaging mode included in the MRI imaging mode.

At least one parameter included in at least one of the plurality of first parameter sets and the second parameter set may comprise a value which relates to adjusting or setting an image-capturing operation in each of the plurality of imaging modes.

At least one of the first tab and the second tab may further comprise a slide bar which relates to changing a tab image defined by a viewing area of the at least one of the first tab and the second tab, and the display may be further configured to display the UI image so as to include a tab image which is obtained based on a movement of the slide bar.

According to one or more exemplary embodiments, a method for displaying a UI image, which is performable by a medical imaging apparatus, includes displaying a UI image which includes a first tab which includes a plurality of first parameter sets which respectively correspond to a plurality of imaging modes, and a second tab which includes a second parameter set which corresponds to an imaging mode selected from among the plurality of imaging modes, via the medical imaging apparatus; and receiving an input which relates to the UI image.

The UI image may comprise a menu image that includes at least the first tab and the second tab, and the menu image may be switchable between respective contents of at least the first tab and the second tab.

The receiving the input may comprise receiving a first input which relates to changing an arrangement of the plurality of first parameter sets within the first tab, and the method may further comprise generating the UI image by changing the arrangement of the plurality of first parameter sets based on the received first input.

The receiving the input may comprise receiving a second input which relates to changing a layout of the second parameter set within the second tab, and the method may further comprise generating the UI image by changing the layout of the second parameter set based on the received second input.

The receiving the input may comprise receiving a third input which relates to selecting at least one parameter from the second parameter set, and the method may further comprise generating the UI image by including the selected at least one parameter in the plurality of first parameter sets based on the received third input.

The receiving the input may comprise receiving a fourth input which relates to changing a value of at least one parameter included in the plurality of first parameter sets within the first tab, and the method may further comprise generating the UI image such that the at least one parameter having a changed value is distinguished from a parameter having a value which has not been changed in the plurality of first parameter sets based on the received fourth input.

The method may further comprise changing a value of a parameter of the second parameter set that corresponds to the at least one parameter having a changed value; and generating the UI image such that the parameter having a changed value in the second parameter set is distinguished from a parameter having a value which has not been changed in the second parameter set.

The receiving the input may comprise receiving a fifth input which relates to changing a value of at least one parameter included in the second parameter set within the second tab, and the method may further comprise generating the UI image such that the at least one parameter having a changed value in the second parameter set is distinguished from a parameter having a value has not been changed in the second parameter set based on the received fifth input.

The method may further comprise changing a value of a parameter of the plurality of first parameter sets that corresponds to the at least one parameter having a changed value in the second parameter set; and generating the UI image such that the parameter having a changed value in the plurality of first parameter sets is distinguished from a parameter having a value which has not been changed in the plurality of first parameter sets.

At least one of the first tab and the second tab may further comprise a measured value of at least one of a radiation amount and a specific absorption rate generated during a medical image capturing operation in each of the plurality of imaging modes.

At least one of the first tab and the second tab may further comprise an expected value of at least one of the radiation amount and the specific absorption rate generated during the medical image capturing operation in each of the plurality of imaging modes.

The method may further comprise comparing the measured value with the expected value, for each of the plurality of imaging modes; and when the measured value exceeds the expected value, displaying a notification signal which indicates a corresponding amount of excess.

The method may further comprise outputting a notification sound which corresponds to the notification signal.

The method may further comprise comparing the measured value with the expected value, for each of the plurality of imaging modes; and when the measured value exceeds the expected value, displaying UI image such that a parameter which affects the measured value is distinguished from a parameter which does not affect the measured value in at least one of the first tab and the second tab.

The method may further comprise displaying changeable parameters and unchangeable parameters of at least one of the first tab and the second tab such that the changeable parameters of the at least one of the first tab and the second tab are distinguished from the unchangeable parameters based on the received input.

At least one parameter included in at least one of the plurality of first parameter sets and the second parameter set may comprise a value which relates to adjusting or setting an image capturing operation in each of the plurality of imaging modes.

At least one of the first tab and the second tab may further comprise a slide bar which relates to changing a tab image defined by a viewing area of the at least one of the first tab and the second tab, and the method may further comprise displaying the UI image so as to include a tab image which is obtained based on a movement of the slide bar.

According to one or more exemplary embodiments, a non-transitory computer-readable recording medium may have recorded thereon a program, which when executed by a computer, performs the above-described method.

BRIEF DESCRIPTION OF THE DRAWINGS

These and/or other aspects will become apparent and more readily appreciated from the following description of exemplary embodiments, taken in conjunction with the accompanying drawings in which:

FIGS. 7A and 7B are views which illustrate an operation of a medical imaging apparatus, according to an exemplary embodiment;

FIGS. 8A and 8B are views which illustrate an operation of a medical imaging apparatus, according to an exemplary embodiment;

FIGS. 9A, 9B, 9C, and 9D are views which illustrate an operation of a medical imaging apparatus, according to an exemplary embodiment;

FIGS. 10A, 10B, 10C, and 10D are views which illustrate an operation of a medical imaging apparatus, according to an exemplary embodiment;

FIGS. 11A, 11B, 11C, and 11D are views which illustrate an operation of a medical imaging apparatus, according to an exemplary embodiment;

FIGS. 12A, 12B, and 12C are views which illustrate an operation of a medical imaging apparatus, according to an exemplary embodiment;

FIGS. 13A, 13B, and 13C are views which illustrate an operation of a medical imaging apparatus, according to an exemplary embodiment;

FIGS. 14A, 14B, and 14C are views which illustrate an operation of a medical imaging apparatus, according to an exemplary embodiment;

FIGS. 15A and 15B are views which illustrate an operation of a medical imaging apparatus, according to an exemplary embodiment;

DETAILED DESCRIPTION

Figure 1:
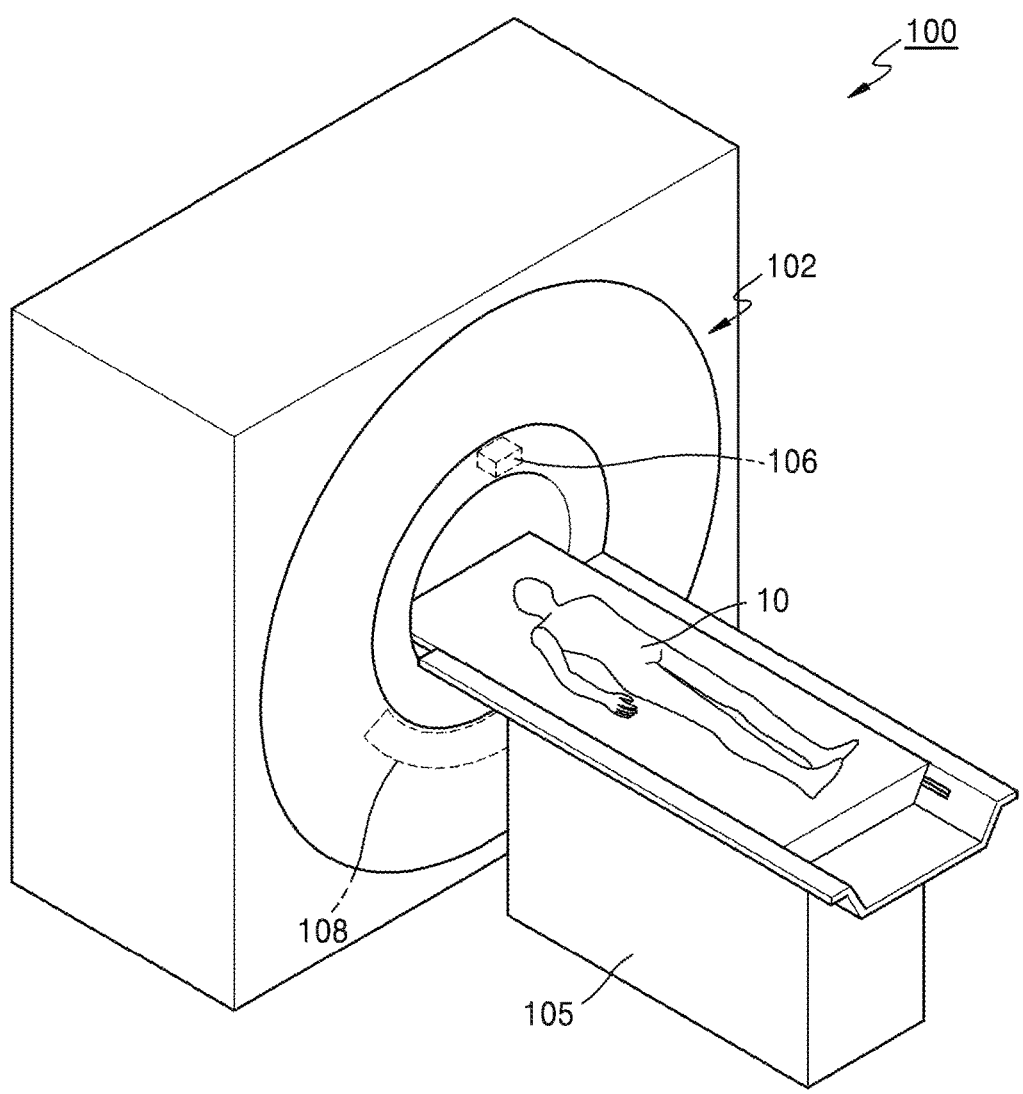
FIG. 1 schematically illustrates a computed tomography (CT) system which uses a medical imaging apparatus, according to an exemplary embodiment.

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present inventive concept will now be described more fully with reference to the accompanying drawings, in which exemplary embodiments are shown. The present inventive concept may, however, be embodied in many different forms and should not be construed as being limited to the exemplary embodiments set forth herein; rather, these exemplary embodiments are provided so that this disclosure will be thorough and complete, and will fully convey the present inventive concept to those skilled in the art. The scope of the present inventive concept is only defined in the claims.

The terminology used herein will now be briefly described as the exemplary embodiments will be described in detail based on this terminology.

Although general terms widely used at present were selected for describing the exemplary embodiments in consideration of the functions thereof, these general terms may vary according to intentions of one of ordinary skill in the art, case precedents, the advent of new technologies, and the like. Terms arbitrarily selected by the applicant may also be used in a specific case. In this case, their meanings need to be given in the detailed description of the present disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. Also, the term 'unit' in the exemplary embodiments means a software component or hardware components such as a field-programmable gate array (FPGA) or an application-specific integrated circuit (ASIC), and performs a specific function. However, the term 'unit' is not limited to software or hardware. The term 'unit' may be configured to be included in an addressable storage medium or to reproduce one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with the smaller number of components and 'units', or may be divided into additional components and 'units'.

Exemplary embodiments are described in detail herein with reference to the accompanying drawings so that this disclosure may be easily performed by one of ordinary skill in the art to which the present inventive concept pertains. In the drawings, parts irrelevant to the description are omitted for simplicity of explanation.

Throughout the specification, "image" may refer to multi-dimensional data formed of discrete image elements (e.g., pixels in a two-dimensional (2D) image and voxels in a three-dimensional (3D) image). For example, an image may include a medical image of an object which is acquired by any of an X-ray apparatus, a computed tomography (CT) apparatus, a magnetic resonance imaging (MRI) apparatus, an ultrasound diagnosis apparatus, and/or another medical imaging system.

Throughout the specification, "object" may include a human, an animal, or a part of a human or animal. For example, the object may include the liver, the heart, the womb, the brain, a breast, the abdomen, or a blood vessel. Further, the "object" may include a phantom. The phantom means a material having a volume that is approximately the density and effective atomic number of a living thing, and may include a sphere phantom having a property similar to a human body.

In the entire specification, "user" generally refers to a medical professional, such as a doctor, a nurse, a medical laboratory technologist, and an engineer who repairs a medical apparatus, but the user is not limited thereto.

Throughout the specification, a "CT image" may mean a cross-sectional image obtained by synthesizing a plurality of X-ray images that are obtained by scanning an object while a CT apparatus rotates about at least one axis with respect to the object.

In the present specification, "MRI" refers to an image of an object obtained by using the nuclear magnetic resonance principle.

In the present specification, "pulse sequence" refers to continuity of signals repeatedly applied by an MRI apparatus. A pulse sequence may include a time parameter of a radio frequency (RF) pulse, for example, repetition time (TR) or echo time (TE).

Because a CT system is capable of providing a cross-sectional image of an object, the CT system may distinctively express an inner structure (e.g., an organ such as a kidney or a lung) of the object, as compared with a general X-ray image-capturing apparatus.

The CT system may obtain a plurality of pieces of image data with a thickness not more than 2 mm for several tens to several hundreds of times per second and then may process the plurality of pieces of image data, thereby providing a relatively accurate cross-sectional image of the object. In the past, only a horizontal cross-sectional image of the object could be obtained, but this issue has been overcome due to various image reconstruction methods. Examples of 3D image reconstruction methods include:

A shaded surface display (SSD) method: The SSD method is an initial 3D imaging method by which only voxels having a predetermined Hounsfield Units (HU) value are displayed.

A maximum intensity projection (MIP)/minimum intensity projection (MinIP) method: The MIP/MinIP method is a 3D imaging method by which only voxels having the greatest or smallest HU value from among voxels that construct an image are displayed.

A volume rendering (VR) method: The VR method is an imaging method which facilitates adjusting a color and transmittance of voxels that construct an image, according to interest areas.

A virtual endoscopy method: This method facilitates an endoscopy observation in a 3D image that is reconstructed by using the VR method or the SSD method.

A multi planar reformation (MPR) method: The MPR method is used to reconstruct an image into a different cross-sectional image. A user may reconstruct an image in any desired direction.

An editing method: This method involves editing adjacent voxels so as to enable a user to easily observe an interest area in volume rendering.

A voxel of interest (VOI) method: The VOI method is used to only display a selected area in volume rendering.

A CT system 100 according to an exemplary embodiment will now be described with reference to FIGS. 1 and 2. The CT system 100 may include devices having any of various forms.

FIG. 1 schematically illustrates the CT system 100, which is used as a medical imaging apparatus according to an exemplary embodiment. Referring to FIG. 1, the CT system 100 may include a gantry 102, a table 105, an X-ray generating unit (also referred to herein as an "X-ray generator") 106, and an X-ray detecting unit (also referred to herein as an "X-ray detector") 108.

The gantry 102 may include the X-ray generating unit 106 and the X-ray detecting unit 108.

An object 10 may be positioned on the table 105.

The table 105 may move in a predetermined direction (e.g., at least one of up, down, right, and left directions) during a CT scan. Further, the table 105 may tilt or rotate by a predetermined angle in a predetermined direction.

The gantry 102 may also tilt by a predetermined angle in a predetermined direction.

Figure 2:
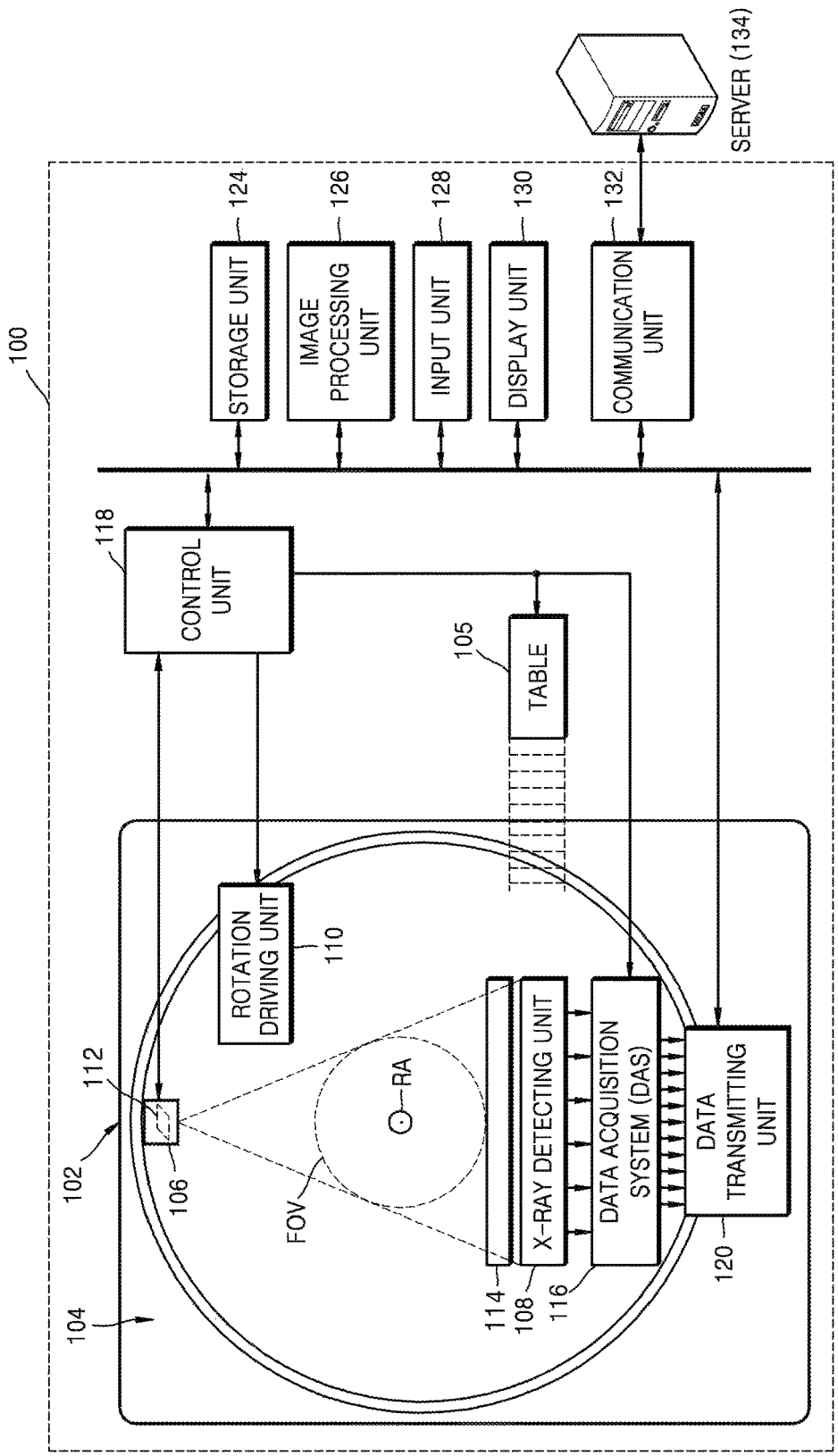
FIG. 2 illustrates a structure of the CT system of FIG. 1.

FIG. 2 illustrates a structure of the CT system 100.

The CT system 100 may include the gantry 102, the table 105, a control unit (also referred to herein as a "controller") 118, a storage unit (also referred to herein as a "storage device" and/or as a "storage") 124, an image processing unit (also referred to herein as an "image processor") 126, an input unit (also referred to herein as an "input device") 128, a display unit (also referred to herein as a "display device" and/or as a "display") 130, and a communication unit (also referred to herein as a "communication module" and/or as a "communicator") 132.

As described above, the object 10 may be positioned on the table 105. In the present exemplary embodiment, the table 105 may move in a predetermined direction (e.g., at least one of up, down, right, and left directions), and movement of the table 105 may be controlled by the control unit 118.

The gantry 102 may include a rotating frame 104, the X-ray generating unit 106, the X-ray detecting unit 108, a rotation driving unit (also referred to herein as a "rotation driver") 110, a data acquisition system (DAS) 116, and a data transmitting unit (also referred to herein as a "data transmitter") 120.

The gantry 102 may include the rotating frame 104 which has a loop shape which is capable of rotating with respect to a predetermined rotation axis RA. Alternatively, the rotating frame 104 may have a disc shape.

The rotating frame 104 may include the X-ray generating unit 106 and the X-ray detecting unit 108 which are oriented to face each other so as to have predetermined field of views (FOV). The rotating frame 104 may also include an anti-scatter grid 114. The anti-scatter grid 114 may be positioned between the X-ray generating unit 106 and the X-ray detecting unit 108.

In a medical imaging system, X-ray radiation that reaches a detector (or a photosensitive film) includes not only attenuated primary radiation that forms a valuable image but also includes scattered radiation that deteriorates a quality of an image. In order to transmit the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, formation of the anti-scatter grid 114 is not limited thereto.

The rotating frame 104 may receive a driving signal from the rotation driving unit 110 and may rotate the X-ray generating unit 106 and the X-ray detecting unit 108 at a predetermined rotation speed. The rotating frame 104 may receive the driving signal and power from the rotation driving unit 110 while the rotating frame 104 contacts the rotation driving unit 110 via a slip ring (not shown). Further, the rotating frame 104 may receive the driving signal and power from the rotation driving unit 110 via wireless communication.

The X-ray generating unit 106 may receive a voltage and current from a power distribution unit (PDU) (not shown) via a slip ring (not shown) and then a high voltage generating unit (not shown), and then may generate and emit an X-ray. When the high voltage generating unit applies a predetermined voltage (hereinafter, referred as the tube voltage) to the X-ray generating unit 106, the X-ray generating unit 106 may generate X-rays having a plurality of energy spectra that correspond to the tube voltage.

The X-ray generated by the X-ray generating unit 106 may be caused to have a predetermined shape by a collimator 112.

The X-ray detecting unit 108 may be positioned to face the X-ray generating unit 106. The X-ray detecting unit 108 may include a plurality of X-ray detecting devices. Each of the plurality of X-ray detecting devices may establish one respective channel, but one or more exemplary embodiments are not limited thereto.

The X-ray detecting unit 108 may detect the X-ray that is generated by the X-ray generating unit 106 and that is transmitted via the object 10, and may generate an electrical signal which corresponds to the intensity of the detected X-ray.

The X-ray detecting unit 108 may include an indirect-type X-ray detector configured for detecting radiation after converting the radiation into light, and a direct-type X-ray detector configured for detecting radiation after directly converting the radiation into electric charges. The indirect-type X-ray detector may use a scintillator. The direct-type X-ray detector may use a photon counting detector. The DAS 116 may be connected to the X-ray detecting unit 108. Electrical signals generated by the X-ray detecting unit 108 may be wiredly or wirelessly collected by the DAS 116. The electrical signals generated by the X-ray detecting unit 108 may be provided to an analog-to-digital converter (not shown) via an amplifier (not shown).

According to a slice thickness and/or the number of slices, only some of a plurality of pieces of data collected by the X-ray detecting unit 108 may be provided to the image processing unit 126 via the data transmitting unit 120, or the image processing unit 126 may select only some of the plurality of pieces of data.

Such a digital signal may be provided to the image processing unit 126 via the data transmitting unit 120. The digital signal may be wiredly or wirelessly provided to the image processing unit 126.

The control unit 118 may control an operation of each of the elements in the CT system 100. For example, the control unit 118 may control operations of the table 105, the rotation driving unit 110, the collimator 112, the DAS 116, the storage unit 124, the image processing unit 126, the input unit 128, the display unit 130, the communication unit 132, or the like.

The image processing unit 126 may receive data obtained from the DAS 116 (e.g., pure data before a processing operation), via the data transmitting unit 120, and may perform pre-processing.

The pre-processing may include any of a process for correcting sensitivity irregularity between channels, a process for correcting a signal loss due to a rapid decrease of signal strength or due to an X-ray absorbing material such as metal, and/or the like.

Data output from the image processing unit 126 may be referred as raw data or projection data. The projection data may be stored together with and scanning conditions (e.g., the tube voltage, a scanning angle, etc.) during acquisition of the projection data, in the storage unit 124.

The projection data may include a group of data values that correspond to the intensity of the X-ray that has propagated through the object 10. For convenience of description, a group of a plurality of pieces of projection data that are simultaneously obtained from all channels by a same scan angle is referred as a projection data set.

The storage unit 124 may include at least one storage medium selected from among a flash memory type storage medium, a hard disk type storage medium, a multimedia card micro type storage medium, card type memory (for example, a secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disk, and an optical disk.

The image processing unit 126 may reconstruct a cross-sectional image with respect to the object 10 by using the projection data set. The cross-sectional image may include a 3D image. In particular, the image processing unit 126 may reconstruct a 3D image of the object 10 by using a cone beam reconstruction method or the like, based on the obtained projection data set.

The input unit 128 may receive an external input with respect to any of an X-ray tomography imaging condition, an image processing condition, or the like. For example, the X-ray tomography imaging condition may include any of a plurality of tube voltages, an energy value setting with respect to a plurality of X-rays, a selection of an image-capturing protocol, a selection of an image reconstruction method, a setting of a FOV area, the number of slices, a slice thickness, a setting of image post-processing parameters, or the like. The image processing condition may include any of a resolution of an image, an attenuation coefficient setting with respect to the image, a setting of an image combining ratio, or the like.

The input unit 128 may include a device configured for receiving a predetermined input from an external source. For example, the input unit 128 may include any of a microphone, a keyboard, a mouse, a joystick, a touch pad, a touch pen, a voice recognition device, a gesture recognition device, or the like.

The display unit 130 may display an X-ray tomography image reconstructed by the image processing unit 126.

Exchanges of data, power, or the like between the aforementioned elements may be performed by at least one of wired communication, wireless communication, and optical communication.

The communication unit 132 may perform communication with any one or more of an external device, an external medical apparatus, etc. via a server 134 or the like. The communication will now be described with reference to FIG. 4.

An MRI system is an apparatus which is configured for acquiring a sectional image of a part of a target object by expressing, in a contrast comparison, a strength of a MR signal with respect to a radio frequency (RF) signal generated in a magnetic field having a specific strength. For example, if an RF signal that only resonates a specific atomic nucleus (for example, a hydrogen atomic nucleus) is irradiated for an instant onto a target object that lies in a strong magnetic field and then such irradiation stops, an MR signal is emitted from the specific atomic nucleus, and thus the MRI system may receive the MR signal and acquire an MR image based on the received MR signal. The MR signal denotes an RF signal emitted from the target object. An intensity of the MR signal may be determined according to a density of a predetermined atom (for example, hydrogen) of the target object, a relaxation time T1, a relaxation time T2, and a flow of blood or the like.

MRI systems include characteristics which are different from those of other imaging apparatuses. Unlike image apparatuses such as CT apparatuses that acquire images based upon a direction of detection hardware, MRI systems may acquire two-dimensional (2D) images and/or three-dimensional (3D) volume images that are oriented toward an optional point. MRI systems do not expose radiation to objects and examiners, unlike CT apparatuses, X-ray apparatuses, position emission tomography (PET) apparatuses, and single photon emission CT (SPECT) apparatuses. Further, MRI systems may acquire images having high soft tissue contrast, and may acquire neurological images, intravascular images, musculoskeletal images, and oncologic images that are useful for precisely describing abnormal tissues.

Figure 3:
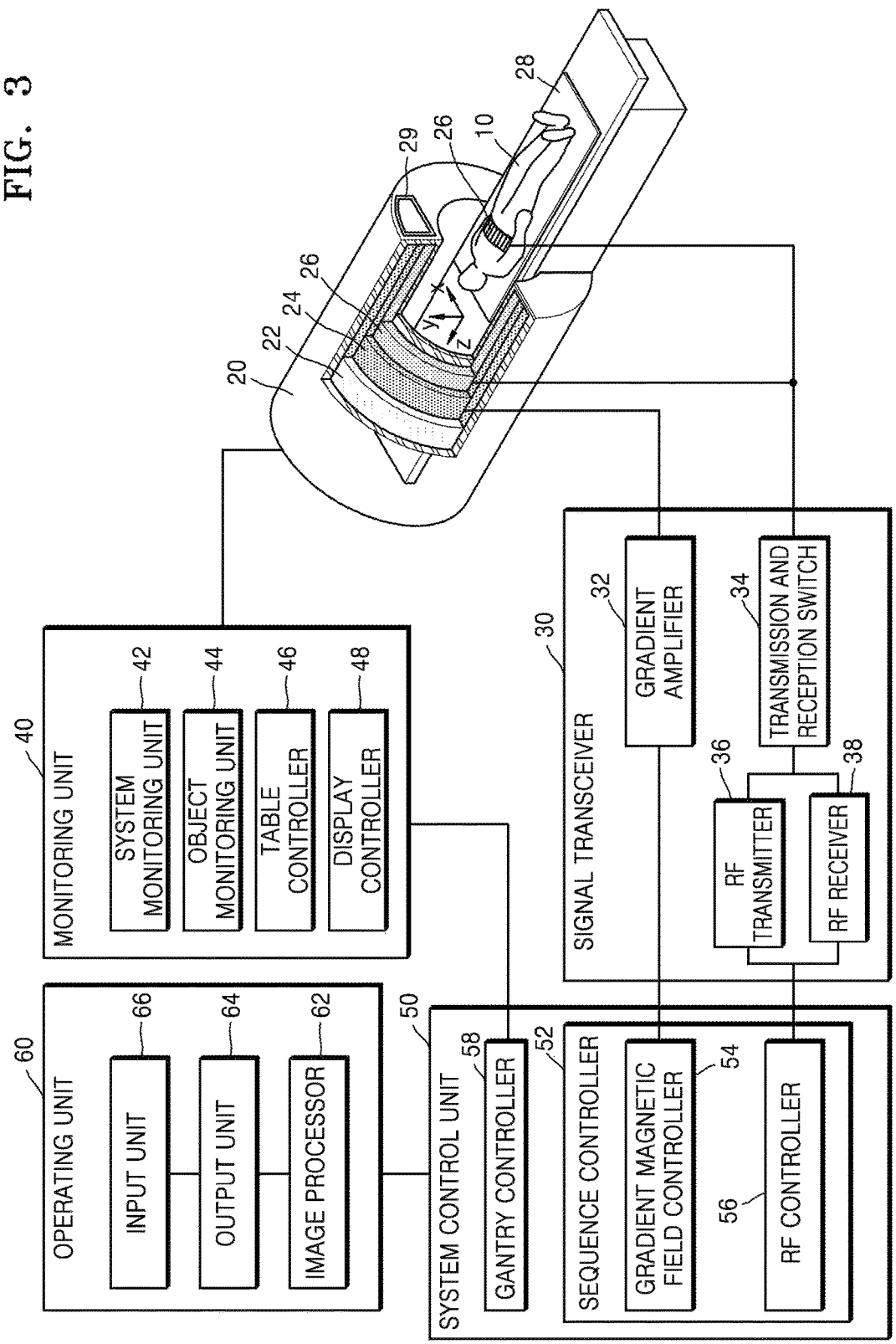
FIG. 3 is a schematic diagram of an MRI system which uses a medical imaging apparatus, according to an exemplary embodiment.

FIG. 3 is a schematic diagram of an MRI system which is used as a medical imaging apparatus according to an exemplary embodiment. Referring to FIG. 3, the general MRI system may include a gantry 20, a signal transceiver 30, a monitoring unit (also referred to herein as a "monitoring device" and/or as a "monitor") 40, a system control unit (also referred to herein as a "system controller") 50, and an operating unit (also referred to herein as an "operating module") 60.

The gantry 20 blocks electromagnetic waves generated by a main magnet 22, a gradient coil 24, and an RF coil 26 from being externally emitted. A magnetostatic field and a gradient magnetic field are formed at a bore in the gantry 20, and an RF signal is irradiated towards an object 10.

The main magnet 22, the gradient coil 24, and the RF coil 26 may be arranged in a predetermined direction with respect to the gantry 20. The predetermined direction may be a coaxial cylinder direction. The object 10 may be disposed on a table 28 that is capable of being inserted into a cylinder along a horizontal axis of the cylinder.

The main magnet 22 generates a magnetostatic field or a static magnetic field for aligning a direction of magnetic dipole moments of atomic nuclei in the object 10 in a constant direction. A precise and accurate MR image of the object 10 may be obtained when a magnetic field generated by the main magnet 22 is strong and uniform.

The gradient coil 24 includes X, Y, and Z coils for generating respective gradient magnetic fields in X-axis, Y-axis, and Z-axis directions which mutually intersect at right angles. The gradient coil 24 may provide location information of each region of the object 10 by variably inducing resonance frequencies according to the regions of the object 10.

The RF coil 26 may emit an RF signal toward a patient and receive an MR signal emitted from the object 10. In detail, the RF coil 26 may transmit, toward the patient and towards atomic nuclei moving in a precessional motion, an RF signal having the same frequency as that of the precessional motion, stop transmitting the RF signal, and then receive an MR signal emitted from the object 10.

For example, in order to cause an atomic nucleus to transition from a low energy state to a high energy state, the RF coil 26 may generate and apply an electromagnetic wave signal having an RF which corresponds to a type of the atomic nucleus, for example, an RF signal, to the object 10. When the electromagnetic wave signal generated by the RF coil 26 is applied to the atomic nucleus, the atomic nucleus may transition from the low energy state to the high energy state. Then, when electromagnetic waves generated by the RF coil 26 disappear, the atomic nucleus to which the electromagnetic waves were applied transitions from the high energy state to the low energy state, thereby emitting electromagnetic waves having a Larmor frequency. In particular, when the applying of the electromagnetic wave signal to the atomic nucleus is stopped, an energy level of the atomic nucleus is changed from a high energy level to a low energy level, and thus the atomic nucleus may emit electromagnetic waves having a Larmor frequency. The RF coil 26 may receive electromagnetic wave signals from atomic nuclei in the object 10.

The RF coil 26 may be realized as one RF transmitting and receiving coil having both a function of generating electromagnetic waves having a wireless frequency which corresponds to a type of an atomic nucleus and a function of receiving electromagnetic waves emitted from an atomic nucleus. Alternatively, the RF coil 26 may be realized as a transmission RF coil having a function of generating electromagnetic waves having a wireless frequency which corresponds to a type of an atomic nucleus, and a reception RF coil having a function of receiving electromagnetic waves emitted from an atomic nucleus.

The RF coil 26 may be fixed to the gantry 20 or may be detachable. When the RF coil 26 is detachable, the RF coil 26 may be an RF coil for a part of the object, such as any of a head RF coil, a chest RF coil, a leg RF coil, a neck RF coil, a shoulder RF coil, a wrist RF coil, or an ankle RF coil.

The RF coil 26 may communicate with an external apparatus via wires and/or wirelessly, and may also perform dual tune communication according to a communication frequency band.

The RF coil 26 may include any of a birdcage coil, a surface coil, or a transverse electromagnetic (TEM) coil according to structures.

The RF coil 26 may include any of a transmission exclusive coil, a reception exclusive coil, or a transmission and reception coil according to methods of transmitting and receiving an RF signal.

The RF coil 26 may be an RF coil which is configured for any one of various numbers of channels, such as 16 channels, 32 channels, 72 channels, and 144 channels.

Hereinafter, a case in which the RF coil 26 is an RF multi-coil including a plurality of coils respectively corresponding to a plurality of channels is described. The RF multi-coil may be referred to a multi-channel RF coil.

The gantry 20 may further include a display 29 disposed outside the gantry 20 and a display (not shown) disposed inside the gantry 20. The gantry 20 may provide predetermined information to the user or the object via the display 29 and the display respectively disposed outside and inside the gantry 20.

The signal transceiver 30 may control the gradient magnetic field formed inside the gantry 20, i.e., in the bore, according to a predetermined MR sequence, and control transmission and reception of an RF signal and an MR signal.

The signal transceiver 30 may include a gradient amplifier 32, a transmission and reception switch 34, an RF transmitter 36, and an RF receiver 38.

The gradient amplifier 32 drives the gradient coil 24 included in the gantry 20, and may supply a pulse signal for generating a gradient magnetic field to the gradient coil 24 according to control of a gradient magnetic field controller 54. By controlling the pulse signal supplied from the gradient amplifier 32 to the gradient coil 24, gradient magnetic fields in X-axis, Y-axis, and Z-axis directions may be composed.

The RF transmitter 36 and the RF receiver 38 may drive the RF coil 26. The RF transmitter 36 may supply an RF pulse in a Larmor frequency to the RF coil 26, and the RF receiver 38 may receive an MR signal received by the RF coil 26.

The transmission and reception switch 34 may adjust transmitting and receiving directions of the RF signal and the MR signal. For example, the RF signal may be irradiated toward the object 10 via the RF coil 26 during a transmission mode, and the MR signal may be received by the object 10 via the RF coil 26 during a reception mode. The transmission and reception switch 34 may be controlled by a control signal from an RF controller 56.

The monitoring unit 40 may monitor or control the gantry 20 and/or devices mounted on the gantry 20. The monitoring unit 40 may include a system monitoring unit (also referred to herein as a "system monitoring device" and/or as a "system monitor") 42, an object monitoring unit (also referred to herein as an "object monitoring device" and/or as an "object monitor") 44, a table controller 46, and a display controller 48.

The system monitoring unit 42 may monitor and control any one or more of a state of a magnetostatic field, a state of a gradient magnetic field, a state of an RF signal, a state of an RF coil, a state of a table, a state of a device measuring body information of an object, a power supply state, a state of a thermal exchanger, and a state of a compressor.

The object monitoring unit 44 monitors a state of the object 10. In detail, the object monitoring unit 44 may include any of a camera configured for observing movement or position of the object 10, a respiration measurer configured for measuring the respiration of the object 10, an electrocardiogram (ECG) measurer configured for measuring ECG of the object 10, and/or a temperature measurer configured for measuring a temperature of the object 10.

The table controller 46 controls movement of the table 28 where the object 10 is positioned. The table controller 46 may control the movement of the table 28 according to sequence control of a sequence controller 52. For example, during moving imaging of the object 10, the table controller 46 may continuously or discontinuously move the table 28 according to the sequence control of the sequence controller 52, and thus the object 10 may be photographed in a field of view (FOV) which is larger than that of the gantry 20.

The display controller 48 controls the display 29 and the display respectively outside and inside the gantry 20. In detail, the display controller 48 may turn on or off the display 29 and the display outside and inside the gantry 20, and may control a screen to be output on the display 29 and the display. Further, when a speaker is located inside or outside the gantry 20, the display controller 48 may turn on or off the speaker and/or control the speaker to output sound.

The system control unit 50 may include the sequence controller 52, which is configured for controlling a sequence of signals formed in the gantry 20, and a gantry controller 58, which is configured for controlling the gantry 20 and the devices mounted on the gantry 20.

The sequence controller 52 may include the gradient magnetic field controller 54 which is configured for controlling the gradient amplifier 32, and the RF controller 56 which is configured for controlling the RF transmitter 36, the RF receiver 38, and the transmission and reception switch 34. The sequence controller 52 may control the gradient amplifier 32, the RF transmitter 36, the RF receiver 38, and the transmission and reception switch 34 according to a pulse sequence received from the operating unit 60. In particular, the pulse sequence includes all information required to control the gradient amplifier 32, the RF transmitter 36, the RF receiver 38, and the transmission and reception switch 34, for example, may include information about any or all of strength, an application time, and an application timing of a pulse signal applied to the gradient coil 24.

The operating unit 60 requests the system control unit 50 to transmit pulse sequence information while controlling an overall operation of the MRI system.

The operating unit 60 may include an image processor 62 configured for processing an MR signal received from the RF receiver 38, an output unit (also referred to herein as an "output device") 64, and an input unit (also referred to herein as an "input device") 66.

The image processor 62 processes an MR signal received from the RF receiver 38 so as to generate MR image data of the object 10.

The image processor 62 performs any one of various signal processes, such as amplification, frequency transformation, phase detection, low frequency amplification, and filtering, on an MR signal received by the RF receiver 38.

The image processor 62 may arrange digital data in a k space (for example, also referred to as a Fourier space or frequency space) of a memory, and rearrange the digital data into image data via 2D or 3D Fourier transformation.

The image processor 62 may perform a composition process or difference calculation process on image data if required. The composition process may include an addition process on a pixel or a maximum intensity projection (MIP) process. The image processor 62 may store not only rearranged image data but also image data on which a composition process or difference calculation process has been performed, in a memory (not shown) or an external server.

Signal processes applied to MR signals by the image processor 62 may be performed in parallel. For example, a signal process may be performed on a plurality of MR signals received by a multi-channel RF coil in parallel so as to rearrange the plurality of MR signals as image data.

The output unit 64 may output image data which has been generated or rearranged by the image processor 62 to the user. Further, the output unit 64 may output information required for the user to manipulate the MRI system, such as user interface (UI), user information, and/or object information. The output unit 64 may include any of a speaker, a printer, a cathode-ray tube (CRT) display, a liquid crystal display (LCD), a plasma display panel (PDP), an organic light-emitting device (OLED) display, a field emission display (FED), a light-emitting diode (LED) display, a vacuum fluorescent display (VFD), a digital light processing (DLP) display, a flat panel display (FPD) display, a 3D display, or a transparent display, or any one of various output devices that are well known to one of ordinary skill in the art.

The user may input object information, parameter information, a scan condition, a pulse sequence, or information about image composition or difference calculation by using the input unit 66. The input unit 66 may include any of a keyboard, a mouse, a track ball, a voice recognizer, a gesture recognizer, or a touch screen, or may include any one of other various input devices that are well known to one of ordinary skill in the art.

The signal transceiver 30, the monitoring unit 40, the system control unit 50, and the operating unit 60 are separate components in FIG. 3, but it will be apparent to one of ordinary skill in the art that respective functions of the signal transceiver 30, the monitoring unit 40, the system control unit 50, and the operating unit 60 may be performed by another component. For example, the image processor 62 converts an MR signal received by the RF receiver 38 into a digital signal, but such a conversion to a digital signal may be directly performed by the RF receiver 38 or the RF coil 26.

The gantry 20, the RF coil 26, the signal transceiver 30, the monitoring unit 40, the system control unit 50, and the operating unit 60 may be connected to each other via wires or wirelessly, and when they are connected wirelessly, the MRI system may further include an apparatus (not shown) for synchronizing clocks therebetween. Communication between the gantry 20, the RF coil 26, the signal transceiver 30, the monitoring unit 40, the system control unit 50, and the operating unit 60 may be performed by using any of a high-speed digital interface, such as low voltage differential signaling (LVDS), asynchronous serial communication, such as universal asynchronous receiver transmitter (UART), a low-delay network protocol, such as an error synchronous serial communication or a controller area network (CAN), or optical communication, or any other communication method that is well known to one of ordinary skill in the art.

Figure 4:
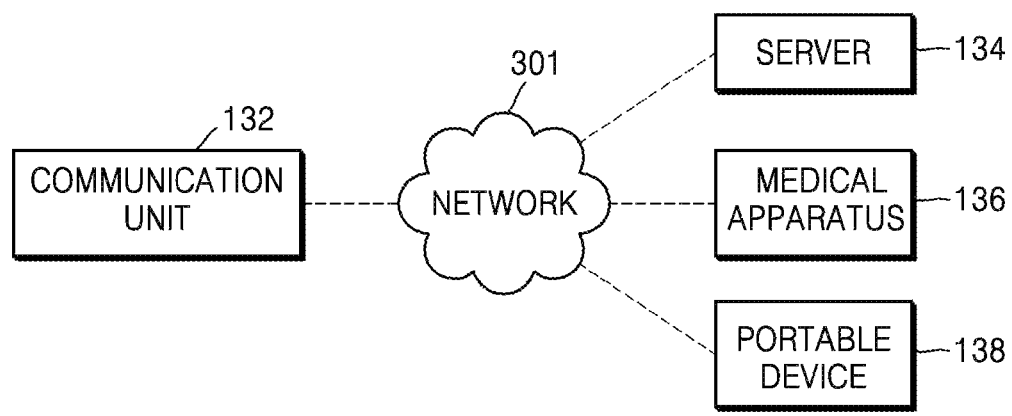
FIG. 4 is a diagram illustrating a structure of a communication unit included in the CT system illustrated in FIG. 2.

FIG. 4 is a schematic diagram illustrating a structure of the communication unit 132.

The communication unit 132 may be connected to at least one of the gantry 20, the signal transceiver 30, the monitoring unit 40, the system control unit 50, and the operating unit 60 of FIG. 3. The communication unit 132 may transmit and receive data to and from a hospital server or another medical apparatus in a hospital connected through a picture archiving and communication system (PACS), and perform data communication according to the digital imaging and communications in medicine (DICOM) standard.

As shown in FIG. 4, the communication unit 132 may be connected to a network 301 via wires or wirelessly in order to communicate with an external server 134, an external medical apparatus 136, and/or an external portable apparatus 138.

In detail, the communication unit 132 may transmit and receive data related to the diagnosis of an object via the network 301, and may also transmit and receive a medical image captured by the external medical apparatus 136, such as a CT apparatus, an ultrasound diagnosing apparatus, an MRI, or an X-ray apparatus.

The communication unit 132 of FIG. 4 may be included in the CT system 100 of FIG. 2. In this case, the communication unit 132 of FIG. 4 may be the same as the communication unit 132 of FIG. 2.

A detailed operation of the communication unit 132 of FIG. 4 when the communication unit 132 is included in the CT system 100 of FIG. 2 will now be described.

The communication unit 132 may be wiredly or wirelessly connected to the network 301 and thus may perform communication with any of the external server 134, the external medical apparatus 136, and/or the external portable apparatus 138. The communication unit 132 may exchange data with a hospital server or other medical apparatuses in a hospital connected via a PACS.

Further, the communication unit 132 may perform data communication with the external portable apparatus 138 or the like, according to a DICOM standard.

The communication unit 132 may transmit and receive data related to diagnosing the object 10, via the network 301. Further, the communication unit 132 may transmit and receive a medical image obtained from the external medical apparatus 136 such as an MRI apparatus, an X-ray apparatus, or the like.

Furthermore, the communication unit 132 may receive a diagnosis history and/or a medical treatment schedule about a patient from the external server 134 and use the same to diagnose the patient. The communication unit 132 may perform data communication with not only the external server 134 or the external medical apparatus 136 in a hospital but also with the external portable apparatus 138 of a user or patient.

The communication unit 132 may transmit information about malfunction of the MRI system or about a medical image quality control to a system manager or a service manager via the network 301, and may receive a feedback regarding the information from the system manager or service manager.

A medical imaging apparatus according to an exemplary embodiment captures a medical image of an object by selecting or setting an imaging mode and a parameter which corresponds to the imaging mode. In detail, the medical imaging apparatuses according to an exemplary embodiment outputs a UI image and receives a selection or setting of the imaging mode and the parameter which corresponds to the imaging mode via the output UI image from a user of the medical imaging apparatus, in order to capture at least one of a CT image, an MRI image, an X-ray image, and an ultrasound image.

The medical imaging apparatus according to an exemplary embodiment may be included in any of a CT system, an MRI system, an X-ray apparatus, and an ultrasound diagnosing apparatus or may be externally connected thereto.

In detail, a medical imaging apparatus according to one or more exemplary embodiments may be included in the MRI system or the CT system 100 described above with reference to FIGS. 1, 2, 3, and 4.

Alternatively, a medical imaging apparatus according to one or more exemplary embodiments may be included in the external medical apparatus 136 or the external portable apparatus 138 connected to the MRI system or the CT system 100 illustrated in FIGS. 1, 2, 3, and 4 via the network 301.

Alternatively, a medical imaging apparatus according to one or more exemplary embodiments may be included in any medical imaging system for reconstructing an image by using data obtained by scanning an object, aside from the MRI system or the CT system 100, or may be externally connected to any medical imaging system.

Figure 5:
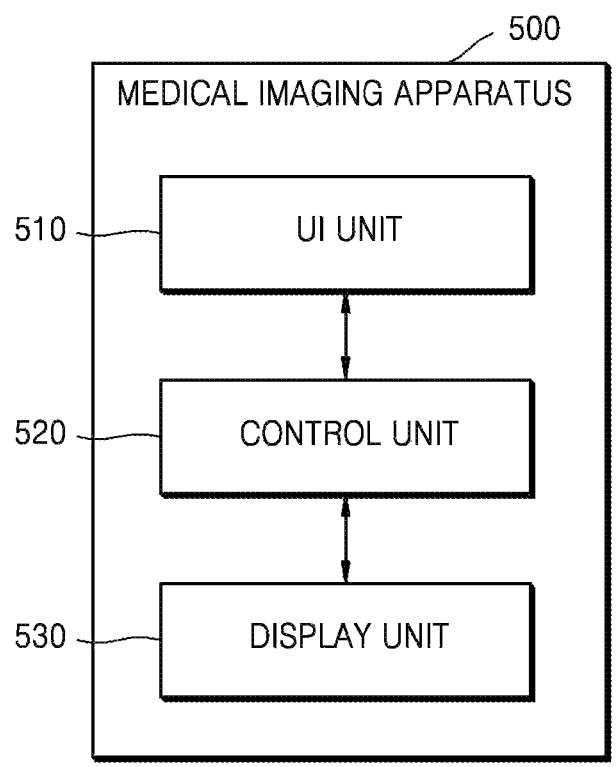
FIG. 5 is a block diagram of a medical imaging apparatus, according to an exemplary embodiment.

FIG. 5 is a block diagram of a medical imaging apparatus 500, according to an exemplary embodiment.

Referring to FIG. 5, the medical imaging apparatus 500 includes a UI unit (also referred to herein as a "user interface device" and/or as a "UI device") 510, a control unit (also referred to herein as a "controller") 520, and a display unit 9 also referred to herein as a "display device" and/or as a "display") 530.

When the medical imaging apparatus 500 is included in the CT system 100 of FIG. 2, the UI unit 510, the control unit 520, and the display unit 530 may respectively correspond to the input unit 128, either the image processing unit 126 or the control unit 118, and the display unit 130 of FIG. 2. Accordingly, descriptions of the medical imaging apparatus 500 that are the same as those made with reference to FIG. 1 are not repeated herein.

When the medical imaging apparatus 500 is included in the MRI system of FIG. 3, the medical imaging apparatus 500 may correspond to the operating unit 60. In detail, the UI unit 510, the control unit 520, and the display unit 530 may respectively correspond to the input unit 66, the image processor 62, and the output unit 64 of FIG. 3. Accordingly, descriptions of the medical imaging apparatus 500 that are the same as those made with reference to FIG. 3 are not repeated herein.

Alternatively, the medical imaging apparatus 500 may be included in the external medical apparatus 136 or the external portable apparatus 138 of FIG. 4.

The control unit 520 generates a UI image which includes a parameter set which corresponds to an imaging mode of the medical imaging apparatus 500. The control unit 520 may change the UI image according to an input received from the UI unit 510. The UI image generated by the control unit 520 is a UI image via which at least one of a mode and a parameter that are applied during a medical image capturing operation is displayed, selected, or set.

The display unit 530 displays a UI image which includes a parameter set which corresponds to an imaging mode of the medical imaging apparatus 500. The UI image includes a first tab which includes a plurality of first parameter sets which respectively correspond to a plurality of imaging modes, and a second tab which includes a second parameter set which corresponds to an imaging mode selected from the plurality of imaging modes. The UI image will be described in more detail below with reference to FIGS. 7A-15B.

For example, the UI unit 510 may include any of a mouse, a keyboard, and/or an input device which includes hard keys for inputting predetermined data. For example, the user may select a mode or parameter included in the UI image by manipulating at least one of a mouse, a keyboard, and other input devices included in the UI unit 510.

The UI unit 510 may be a touch pad. In detail, the UI unit 510 may include a touch pad (not shown) coupled with a display panel (not shown) included in the display unit 530. The display unit 530 displays the UI image on the display panel. When a user inputs a command by touching a certain point on the UI image, the touch pad may sense the input operation and recognize the command input by the user.

In detail, when the UI unit 510 is a touch pad and the user touches a certain point on the UI image, the UI unit 510 senses the touched point. Then, the UI unit 510 may transmit sensed information to the control unit 520. Thereafter, the control unit 520 may recognize a user's request or command which corresponds to the sensed information and may perform the recognized user's request or command.

The control unit 520, the display unit 530, and the UI unit 510 may be connected to each other via wires or wirelessly and may transmit and receive data to and from each other.

Figure 6:
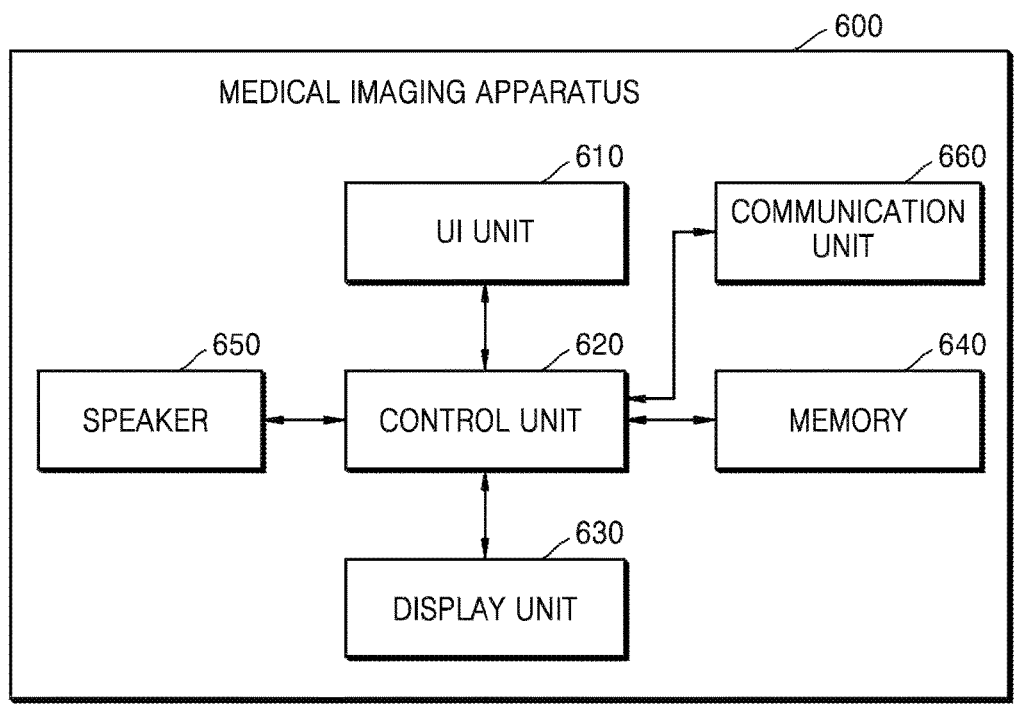
FIG. 6 is a block diagram of a medical imaging apparatus, according to another exemplary embodiment.

FIG. 6 is a block diagram of a medical imaging apparatus 600 according to another exemplary embodiment. The medical imaging apparatus 600 further includes at least one of a memory 640, a speaker 650, and a communication unit 660, as compared with the medical imaging apparatus 500.

In detail, a UI unit 610, a control unit 620, and a display unit 630 of the medical imaging apparatus 600 respectively correspond to the UI unit 510, the control unit 520, and the display unit 530 of the medical imaging apparatus 500 of FIG. 5. Accordingly, descriptions about the medical imaging apparatus 600 that are the same as those of the medical imaging apparatus 500 of FIG. 5 are not repeated.

The memory 640 may store any of various types of data related to a medical image. In detail, the memory 640 may store setting values which correspond to a plurality of imaging modes. In detail, the memory 640 may store at least one piece of parameter data which corresponds to at least one imaging mode.

The memory 640 may also store information related to at least one imaging mode or at least one parameter. The memory 640 may also store medical image data obtained by applying an imaging mode, and a reconstructed medical image.

The communication unit 660 may transmit and receive data to and from an external apparatus via a wired-wireless network. For example, when the medical imaging apparatus 600 is included in the CT system 100 of FIG. 2, the communication unit 660 corresponds to the communication unit 132 of FIGS. 2 and 4, and may exchange data with the external server 134, the external medical apparatus 136, and the external portable apparatus 138.

An example of a method for imaging a medical image includes a method for imaging an object by variously applying imaging modes while scanning the object, such as an MRI or CT image. In the case where imaging modes are variously applied, images having different characteristics may be obtained even when the same region of a body is scanned, by using various parameters which may be considered while scanning the object. In particular, an image which is suitable to a particular purpose may be obtained by changing an imaging mode according to uses or purposes.

A technique applied while capturing a medical image by scanning an object is referred to as an 'imaging mode', a 'scan mode', or a 'scan protocol'. In detail, an imaging mode applied when an object is scanned is generally referred to as a scan mode in the case of CT systems, and is generally referred to as a scan protocol in the case of MRI systems.

Hereinafter, an imaging technique applied to capture a medical image is referred to as an 'imaging mode'.

In an MRI system and a CT system, an object is scanned by applying various imaging modes, and an image of the object is reconstructed by using information obtained accordingly. Imaging modes may be classified based on at least one region of an object. Each imaging mode based on one region of an object may include at least one sub-imaging mode according to uses and purposes.

For example, in a CT system, imaging modes or sub-imaging modes may be classified according to whether a contrast medium is administered and the characteristics of a reconstructed CT image. In addition, an object may be scanned by applying a predetermined imaging mode according to whether a particular scan is a scout scan. The scout scan denotes an imaging mode for ascertaining schematic information about an object, such as, the locations of cancer cells on the object and a fractured region of the object. A user of a medical imaging apparatus may set a suitable imaging mode by referring to medical image information obtained by a scout scan, and may capture a detailed medical image of the object by scanning the object.

For example, CT imaging modes may be classified into a head scan mode, an abdomen scan mode, and a leg scan mode in respective correspondence with the head, abdomen, and leg of the object 10. The head scan mode may include first and second scan modes for acquiring different image characteristics, as sub-scan modes. In detail, the first scan mode may be a scan mode for acquiring a medical image of the bone of the head of the object 10, and the second scan mode may be a scan mode for acquiring a medical image of the blood vessels of the head of the object 10.

For example, in an MRI system, imaging modes and sub-imaging modes may be classified according to a pulse sequence of an MR signal. In detail, an imaging mode for obtaining an MRI reconstructed image is related to a pulse sequence of a signal applied to the object 10 while scanning the object 10, or a pulse sequence generated according to an applied pulse sequence, and may be classified according to a predetermined period of a pulse sequence.

For example, an MR signal is generated correspondingly to an RF signal applied to the object 10 via the RF coil 26 included in the MRI system, while scanning the object 10. The RF signal may be referred to as a pulse sequence.

In a pulse sequence of an RF signal, a time consumed by a nuclear spin to return back up to 63% of original magnetization is referred to as a T1 relaxation time, and a time consumed by the nuclear spin to discharge down to 37% of the original magnetization is referred to as a T2 relaxation time. The photography mode of an MRI system is related to at least one of the T1 relaxation time and the T2 relaxation time. Hereinafter, the T1 relaxation time is referred to as a 'T1 period' and the T2 relaxation time is referred to as a 'T2 period'.

In detail, an imaging mode for obtaining an MRI reconstructed image may be largely classified into a T1 period-related imaging mode, a T2 period-related imaging mode, and a T1 and T2 period-related imaging mode. In detail, examples of the imaging mode include an imaging mode for obtaining a T1 weighted image (hereinafter, referred to as a T1W imaging mode), an imaging mode for obtaining a T2 weighted image (hereinafter, referred to as a T2W imaging mode), an imaging mode for obtaining a T1 flair image (hereinafter, referred to as a T1W flair imaging mode), an imaging mode for obtaining a T2 flair image (hereinafter, referred to as a T2W flair imaging mode), an imaging mode for obtaining a diffusion image (hereinafter, referred to as a diffusion imaging mode), and an imaging mode for obtaining a perfusion image (hereinafter, referred to as a perfusion imaging mode).

For example, MRI imaging modes may be classified into a head imaging mode, an abdomen imaging mode, and a leg imaging mode in respective correspondence with the head, abdomen, and leg of the object 10. The head imaging mode may include the T1W imaging mode and the T2W imaging mode, as sub-imaging modes.

A parameter included in an imaging mode may include a value which relates to adjusting or setting an imaging condition in the imaging mode.

Figure 7A:
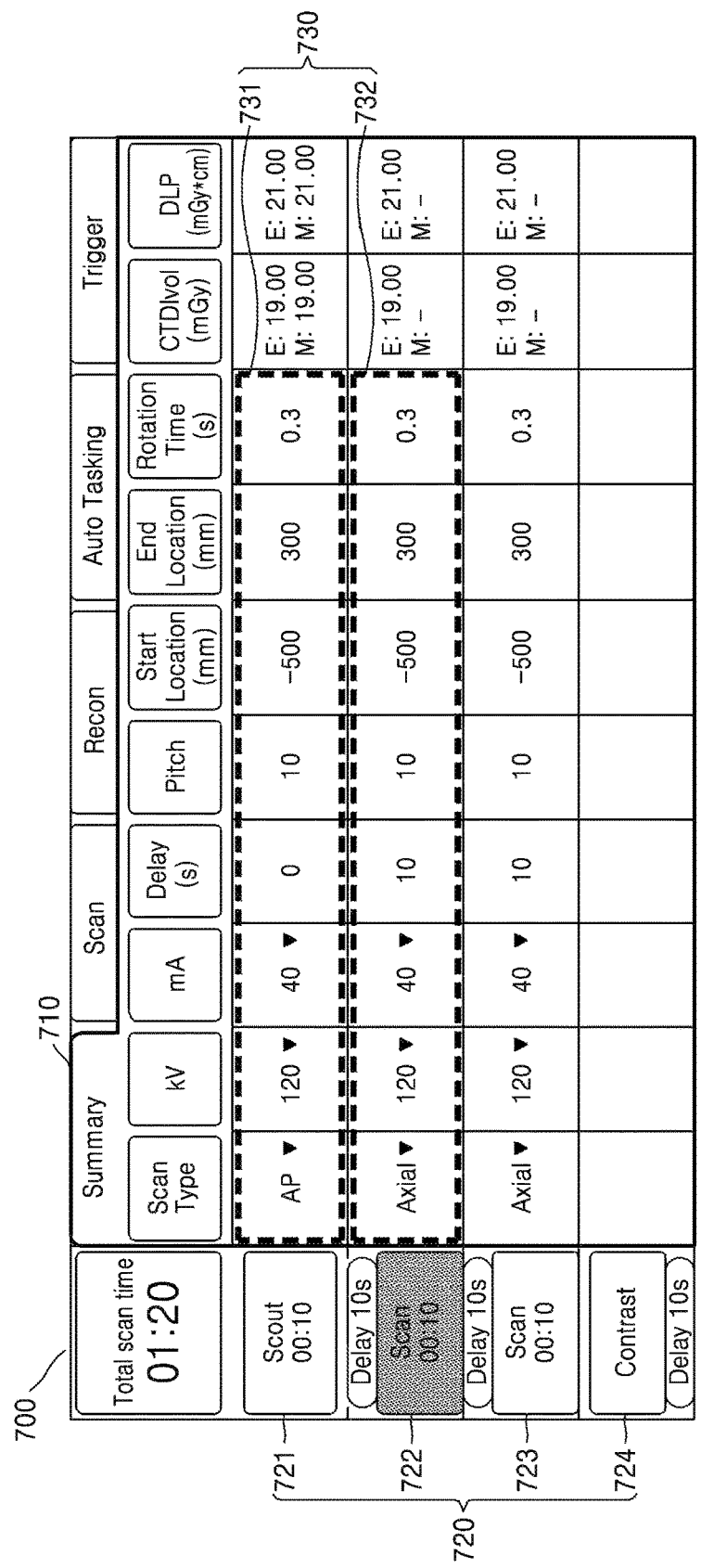

FIGS. 7A and 7B are views which illustrate an operation of a medical imaging apparatus, according to an exemplary embodiment. In detail, FIGS. 7A and 7B illustrate a UI image 700 of a CT apparatus. Referring to FIGS. 7A and 7B, the UI image 700 may include a first tab 710 which includes a plurality of first parameter sets 730 which respectively correspond to a plurality of imaging modes 720, and a second tab 740 which includes a second parameter set 750 which corresponds to an imaging mode 722 selected from the imaging modes 720. A user may select the imaging mode 722 from the imaging modes 720 via the UI unit 610, and the imaging mode 722 may be indicated with a color which is different from the colors of unselected imaging modes 721, 723, and 724 as illustrated in FIGS. 7A and 7B. In FIGS. 7A and 7B, the imaging modes 720 included in the first tab 710 include the imaging mode 721, namely, a scout mode 721 which corresponds to a plurality sub-imaging modes included in an abdomen CT imaging mode, the imaging modes 722 and 723, namely, first and second scan modes 722 and 723 for acquiring different CT image characteristics, and the imaging mode 724, namely, a contrast medium mode 724 for administering a contrast medium to the object 10 and then scanning the object 10. The UI image 700 may include a single menu image which includes the first tab 710 and the second tab 740. The single menu image may be switchable between displaying contents of the first tab 710 and contents of the second tab 740.

In detail, based on a user input which relates to selecting the first tab 710 or the second tab 740, the UI image 700 is generated.

Referring to FIG. 7A, a UI image 700 when the first tab 710 has been selected is illustrated. The first tab 710 includes the plurality of imaging modes 720 and the plurality of first parameter sets 730 which respectively correspond to the plurality of imaging modes 720. For example, in FIG. 7A, the first tab 710 includes the scout mode 721, the first scan mode 722, the second scan mode 723), and the contrast medium mode 724, as the plurality of imaging modes 720. In FIG. 7A, the first tab 710 also includes the plurality of first parameter sets 730, which include a first parameter set 731 corresponding to the scout mode 721, a first parameter set 732 corresponding to the first scan mode 722, and so on.

Referring to FIG. 7B, a UI image 700 when the second tab 740 has been selected is illustrated. The second tab 740 includes the second parameter set 750 which corresponds to the first scan mode 722 selected from the plurality of imaging modes 720. For example, in FIG. 7B, the first scan mode 722 has been selected from the plurality of imaging modes 720. Accordingly, the second tab 740 includes the second parameter set 750 corresponding to the selected first scan mode 722.

The second parameter set 750 may include more types of parameters than the parameters included in the first parameter set 732. For example, the first parameter sets 730 of FIG. 7A include parameters such as a 'Scan Type' parameter indicating a scanning axis of a scanned object, a high voltage 'kV' parameter applied to generate an X-ray radiated to the object during a CT scan, a current 'mA' parameter applied to generate the X-ray, a delay value 'Delay' of a driving signal, a scan start location 'Start Location', a scan end location 'End Location', and a rotation time 'Rotation Time' of a rotation driving unit, whereas the second parameter set 750 of FIG. 7B may further include parameters such as "Scout Length" and "Indicator Timer" in addition to the parameters included in the first parameter sets 730 of FIG. 7A. Various other parameters may also be included in the second parameter set 750 of FIG. 7B according to scan conditions that are determined according to CT scan modes.

A user of a medical imaging apparatus compares pieces of information about a plurality of imaging modes with each other as needed or in order to ascertain various and concrete pieces of information about a single imaging mode. For example, a user may easily compare the parameter values of imaging modes with each other by comparing the first parameter set 732 corresponding to the first scan mode 722 with a first parameter set corresponding to the second scan mode 723. The user may also ascertain parameters that are unable to be checked from the first parameter set 732 of FIG. 7A, from the second parameter set 750 of FIG. 7B, to thereby easily ascertain detailed setting values in an imaging mode and scan conditions in the imaging mode.

The UI image 700 may further include an imaging reconfiguration tab 760, an auto-tasking tab 770, and a trigger tab 780. In detail, the imaging reconfiguration tab 760 is a menu image which relates to a medical image which is a reconfigured image generated via image reconfiguration in a subsequent process by using image data acquired using an imaging mode. The auto-tasking tab 770 is a menu image which includes options for setting functions that are automatically executed by the control unit 520 of the medical imaging apparatus 500, such as functions of sending medical image information acquired during a medical image capturing operation to the external portable apparatus 138 via the network 301 and performing imaging reconfiguration according to user settings. The trigger tab 780 is a menu image which includes options for setting conditions for a medical image capturing operation, such as ECG gating. By using an ECG signal, a medical imaging apparatus may acquire a partial period when a motion of the heart is minimal, and may reconstruct a CT image by using image data acquired during the acquired partial period. ECG gating refers to an operation of selecting a portion of a period from an ECG signal and acquiring image data from the selected period portion (hereinafter, referred to as a partial period) as described above.

In addition, the UI image 700 may be displayed such that changeable parameters and unchangeable parameters of at least one of the first and second tabs 710 and 740 are distinguished from each other, according to user inputs. For example, the UI image 700, may display changeable parameters of the second tab 740 in a first color and unchangeable parameters of the second tab 740 in a second color which is different from the first color, according to a user input.

At least one parameter included in at least one of a first parameter set and a second parameter set included in an imaging mode may include a value which relates to adjusting or setting an imaging condition in the imaging mode. For example, in FIG. 7B, rotation speeds of the X-ray generating unit 106 and the X-ray detecting unit 108 of the CT system 100 may be set using a rotation speed parameter 751 of the second parameter set 750.

FIGS. 8A and 8B are views which illustrate an operation of a medical imaging apparatus, according to an exemplary embodiment. Referring to FIGS. 8A and 8B, a UI image that includes a menu image 830 which includes at least one of a first tab 800 and a second tab 810 is illustrated, and the menu image 830 may switch between displaying the contents of the first tab 800 and the contents of the second tab 810.

Referring to FIG. 8A, a UI image including a menu image 830 switched to the first tab 800 is illustrated. Referring to FIG. 8B, a UI image including a menu image 830 switched to the second tab 810 is illustrated. In detail, a user may switch between the first and second tabs 800 and 810 by using a switch button 820.

FIGS. 9A, 9B, 9C, and 9D are views which illustrate an operation of a medical imaging apparatus, according to an exemplary embodiment. In detail, FIGS. 9A, 9B, 9C, and 9D illustrate a UI image generated by the UI unit 610 receiving a first input which relates to changing an arrangement of a plurality of first parameter sets within a first tab and the control unit 620 changing the arrangement of the first parameter sets based on the received first input.

Figure 9A:
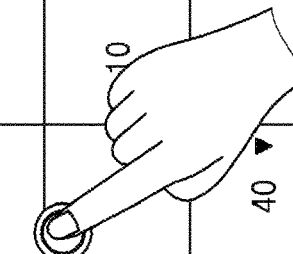
Figure 9B:
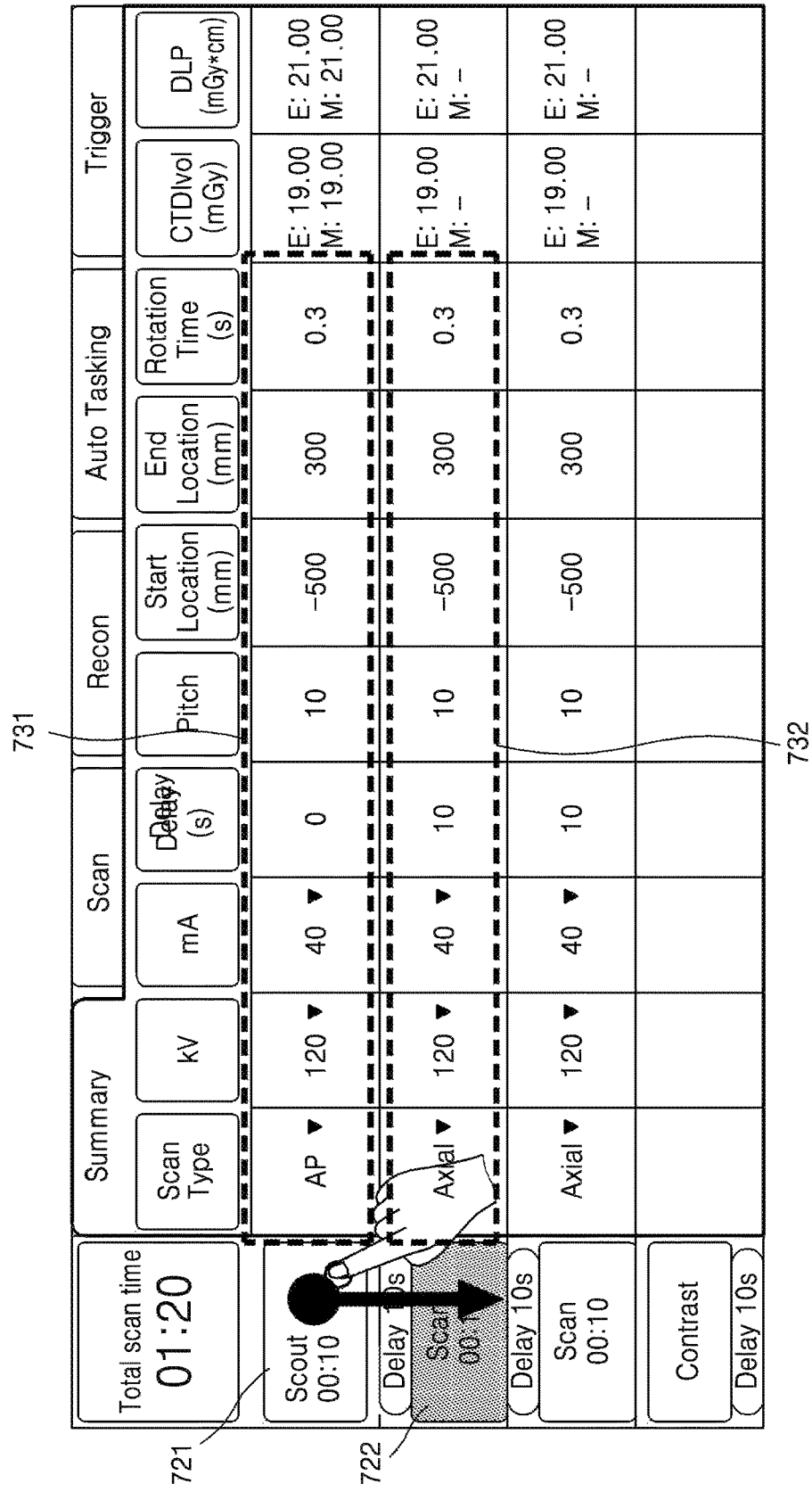
Figure 9D:
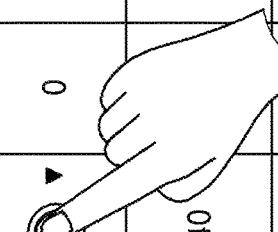

FIG. 9A illustrates an exemplary embodiment in which the medical imaging apparatus 600 of FIG. 6 enters a parameter setting mode. FIG. 9B illustrates an exemplary embodiment of entering and receiving the first input. FIG. 9C illustrates a changed UI image obtained based on the first input. FIG. 9D illustrates an exemplary embodiment in which the medical imaging apparatus 600 exits the parameter setting mode. Referring to FIG. 9A, the medical imaging apparatus 600 may receive an input of holding an arbitrary point on the UI image for a predetermined period of time and may enter into the parameter change mode in order to set or change a first parameter set.

Referring to FIG. 9B, a first input which relates to arranging the scout mode 721 and the first parameter set 731 corresponding thereto below the first scan mode 722 and the first parameter set 732 corresponding thereto is illustrated. The first input may be, for example, a drag & drop input.

Referring to FIG. 9C, a UI image generated by changing an arrangement of a plurality of first parameter sets is illustrated. In detail, the scout mode 721 and the first parameter set 731 corresponding thereto are arranged below the first scan mode 722 and the first parameter set 732 corresponding thereto as a result of the first input.

Referring to FIG. 9D, the medical imaging apparatus 600 in the parameter change mode receives an input of holding an arbitrary point on the UI image for a predetermined period of time and exits the parameter change mode.

FIGS. 10A, 10B, 10C, and 10D are views which illustrate an operation of a medical imaging apparatus, according to an exemplary embodiment. In detail, FIGS. 10A, 10B, 10C, and 10D illustrate a UI image generated by the UI unit 610 receiving a second input for changing a layout of a second parameter set within a second tab and the control unit 620 changing the layout of the second parameter set according to a second input.

Figure 10B:
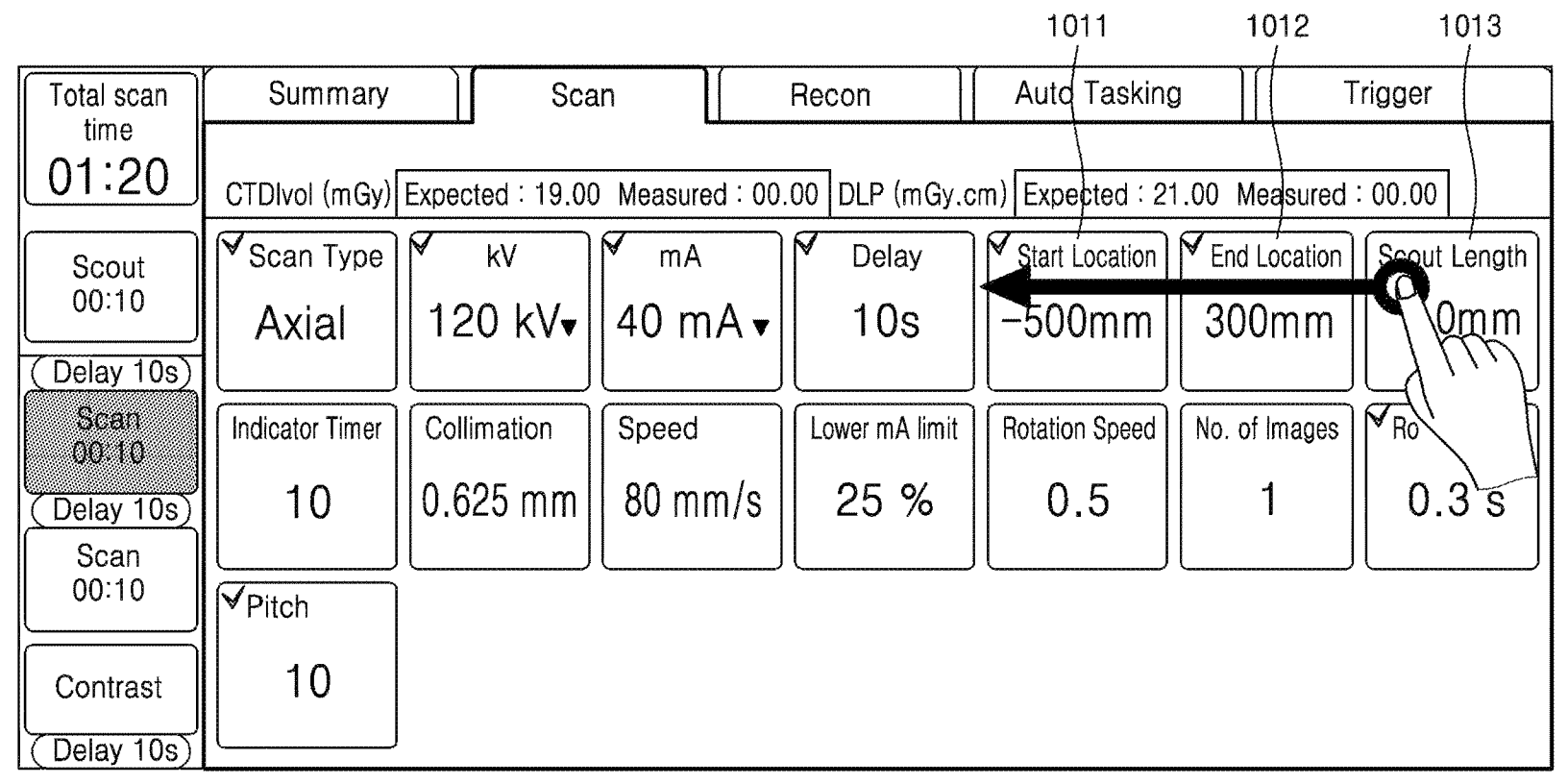
Figure 10C:
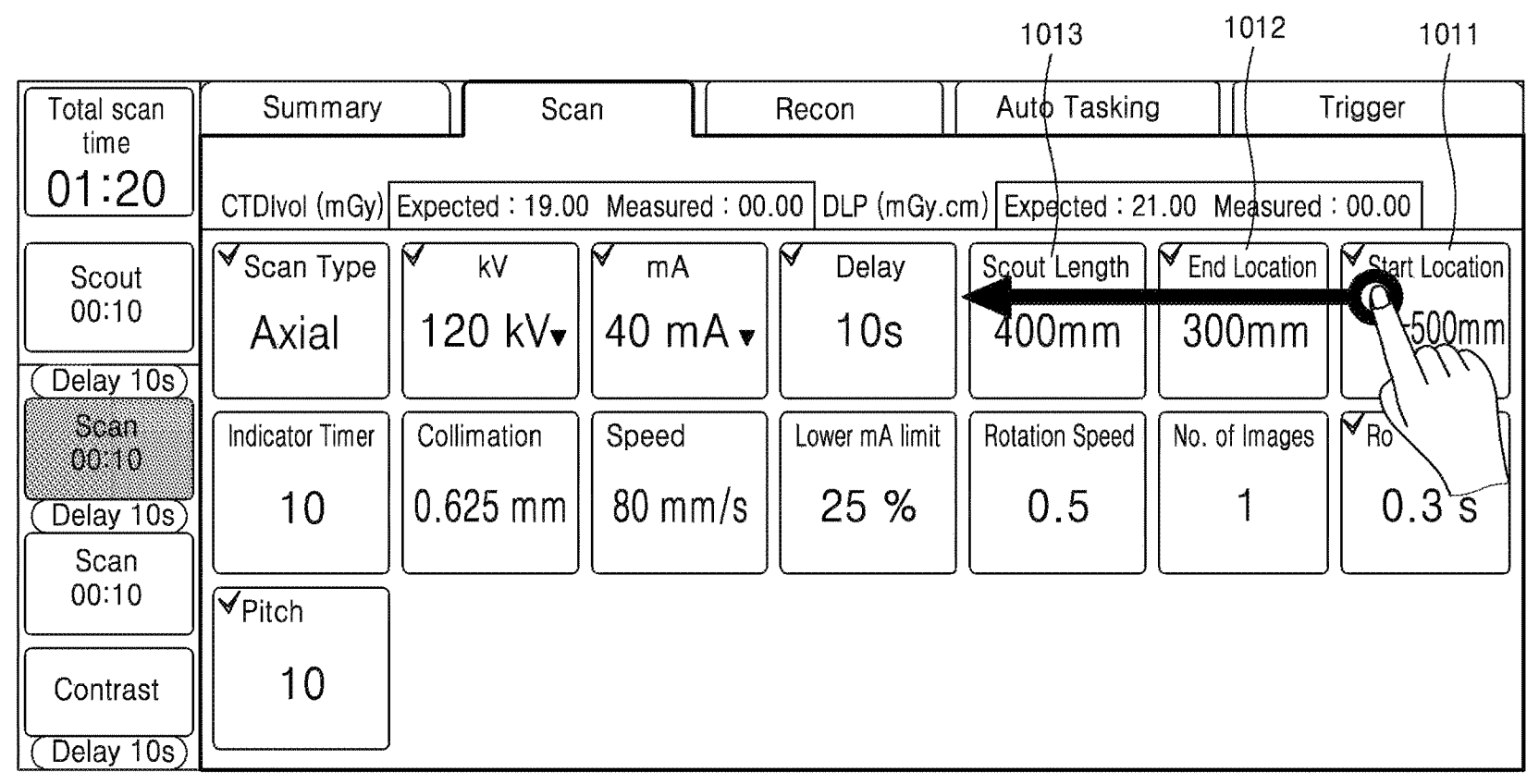
Figure 10D:
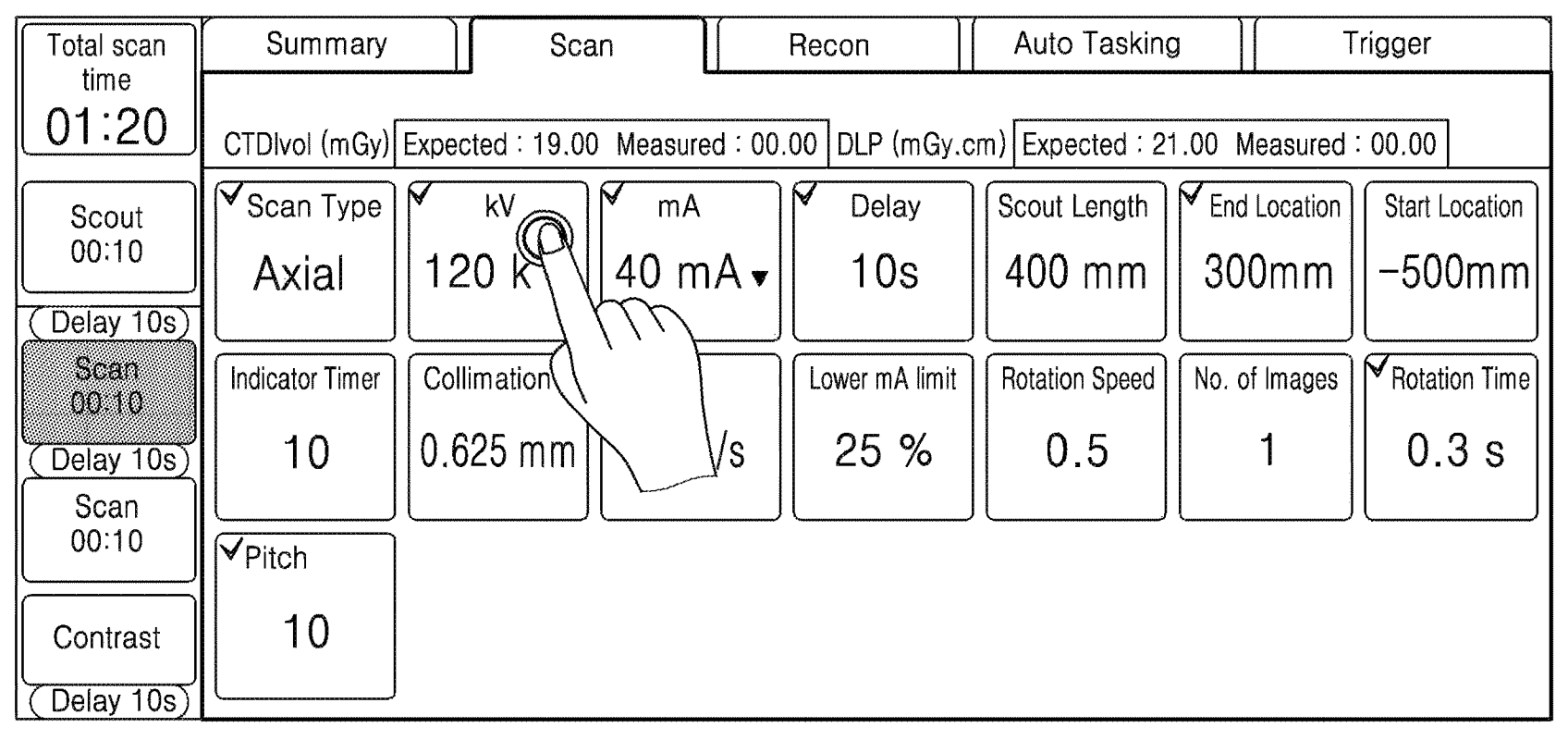

FIG. 10A illustrates an exemplary embodiment in which the medical imaging apparatus 600 of FIG. 6 enters a parameter setting mode. FIG. 10B illustrates an exemplary embodiment of entering and receiving the second input. FIG. 10C illustrates a changed UI image obtained according to the second input. FIG. 10D illustrates an exemplary embodiment in which the medical imaging apparatus 600 exits the parameter setting mode.

Referring to FIG. 10A, the medical imaging apparatus 600 may receive an input of holding an arbitrary point on the UI image for a predetermined period of time and may enter into the parameter change mode in order to set or change a second parameter set.

Referring to FIG. 10B, a second input for changing the arrangement of the second parameter set is illustrated. The second input may be a drag & drop input. In detail, FIG. 10B illustrates a second input which relates to changing an order in which a Start Location parameter 1011, an End Location parameter 1012, and a Scout Length parameter 1013 are arranged in sequence to an order in which the Scout Length parameter 1013, the Start Location parameter 1011, and the End Location parameter 1012 are arranged in sequence.

Referring to FIG. 10C, a UI image generated by changing the layout of the second parameter set is illustrated. In detail, the layout of the second parameter set has been changed in the order in which the Scout Length parameter 1013, the Start Location parameter 1011, and the End Location parameter 1012 are arranged, according to the second input.

Referring to FIG. 10D, the medical imaging apparatus 600 in the parameter change mode may receive an input of holding an arbitrary point on the UI image for a predetermined period of time and thereby exit the parameter change mode.

The control unit 520 may change the layout of the second parameter set so that the layout of the second parameter set corresponds to the changed arrangement of the first parameter sets obtained according to the first input, and change the arrangement of the first parameter sets so that the arrangement of the first parameter sets corresponds to the changed layout of the second parameter set obtained according to the second input.

FIGS. 11A, 11B, 11C, and 11D are views which illustrate an operation of a medical imaging apparatus, according to an exemplary embodiment. In detail, FIGS. 11A, 11B, 11C, and 11D illustrate a UI image generated by a UI unit of the medical imaging apparatus receiving a third input which relates to selecting at least one parameter from a second parameter set and a control unit of the medical imaging apparatus including the selected parameter in a plurality of first parameter sets.

Figure 11A:
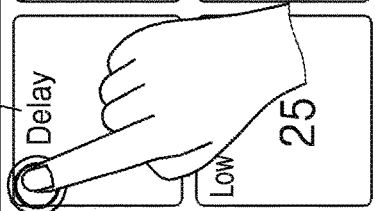
Figure 11B:
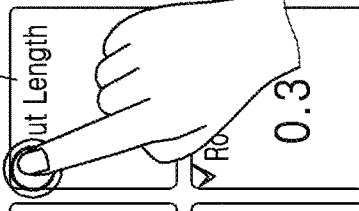
Figure 11C:
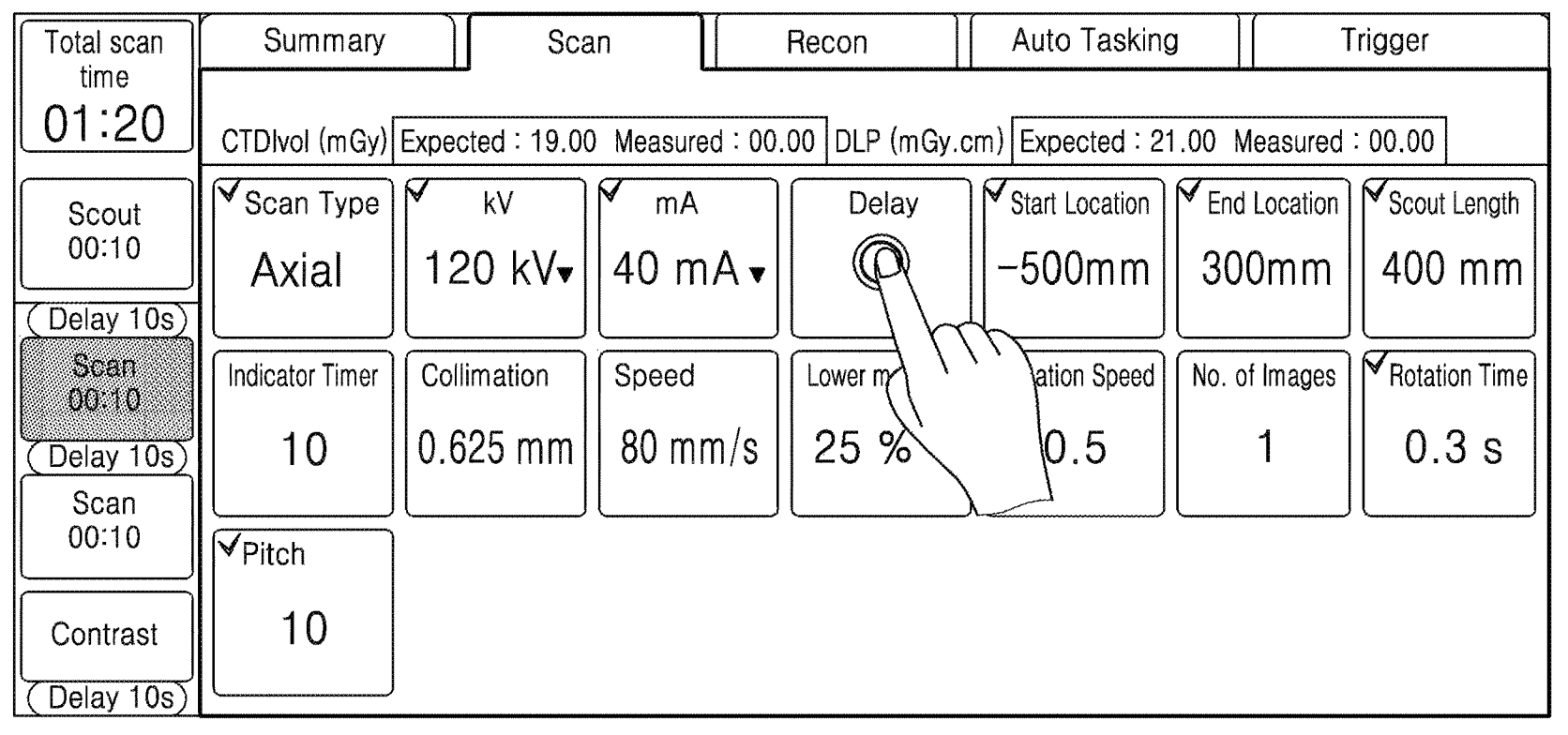

FIGS. 11A and 11B illustrate an exemplary embodiment of entering and receiving the third input. FIG. 11C illustrates an exemplary embodiment in which the parameter setting mode is exited. FIG. 11D illustrates an exemplary embodiment in which a selection-completed parameter set is displayed.

Referring to FIG. 11A, a third input which relates to deselecting a Delay parameter 1110 in the second parameter set in order to not include the Delay parameter 1110 in the first parameter sets in the parameter change mode is illustrated.

Referring to FIG. 11B, a third input which relates to selecting a Scout Length parameter 1120 in the second parameter set in order to include the Scout Length parameter 1120 in the first parameter sets is illustrated.

Referring to FIG. 11C, the medical imaging apparatus in the parameter change mode receives an input of holding an arbitrary point on the UI image for a predetermined period of time and thereby exits the parameter change mode.

Referring to FIG. 11D, a selection-completed parameter set is illustrated.

A parameter included in the first parameter set may be indicated by an additional mark 1130 on the second parameter set, and a parameter not included in the first parameter set may be indicated by an absence of additional marks 1130 on the second parameter set. Accordingly, a user may easily ascertain the parameters included in a first tab by viewing a second parameter set included in a second tab.

Figure 12B:
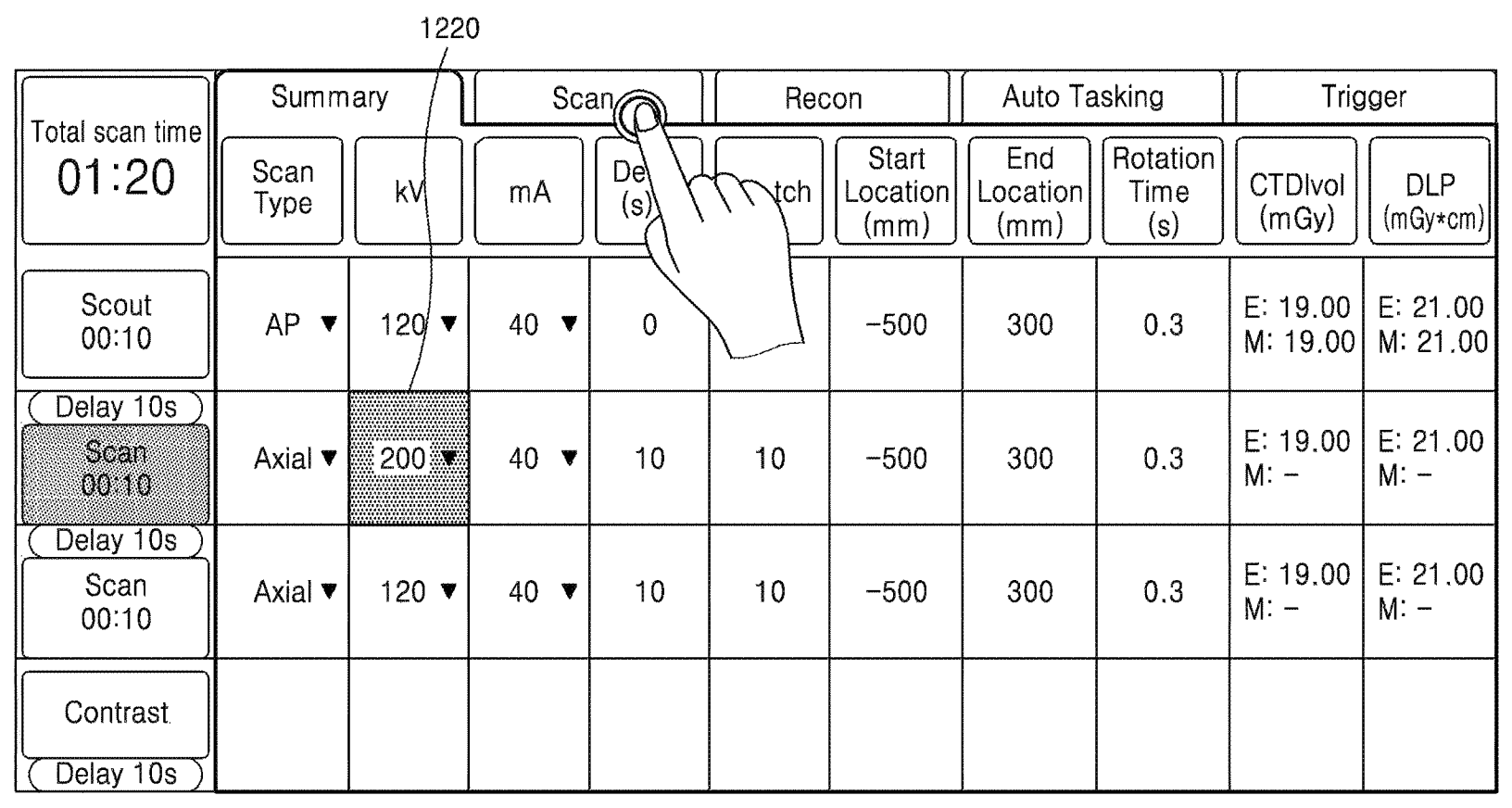

FIGS. 12A, 12B, and 12C are views which illustrate an operation of a medical imaging apparatus, according to an exemplary embodiment. In detail, FIGS. 12A, 12B, and 12C illustrate a UI image generated by a UI unit of the medical imaging apparatus receiving a fourth input which relates to changing the value of at least one parameter included in a plurality of first parameter sets included in a first tab and a control unit of the medical imaging apparatus distinguishing the at least one parameter having changed value from a parameter having a value which is not changed in the plurality of first parameter sets. The UI image of FIGS. 12A, 12B, and 12C is also generated by the control unit changing the value of a parameter included in the second parameter set that corresponds to the value-changed parameter included in the plurality of first parameter and distinguishing the parameter having the changed value from a parameter having a value which is not changed in the second parameter set.

Referring to FIG. 12A, a fourth input which relates to changing a kV parameter 1210 of a first parameter set corresponding to a first scan mode is illustrated. In detail, the fourth input involves changing the value of the kV parameter 1210 from 120 kV to 200 kV.

Referring to FIG. 12B, the kV parameter 1220 having a changed value is distinguished from a parameter for which a value has not been changed, in the first parameter set. For example, in FIG. 12B, the parameter 1220 for which the value has been changed is distinguished from the parameter for which a respective value has not been changed by using different respective colors.

Referring to FIG. 12C, the value of a parameter 1230 of the second parameter set that corresponds to the parameter 1220 for which the value has been changed is changed, and the parameter 1230 having the changed value is distinguished from a parameter having a respective value which has not been changed in the second parameter set. For example, in FIG. 12C, the parameter 1230 for which the value has been changed is distinguished from the parameter for which a respective value has not been changed by using different respective colors.

Figure 13A:
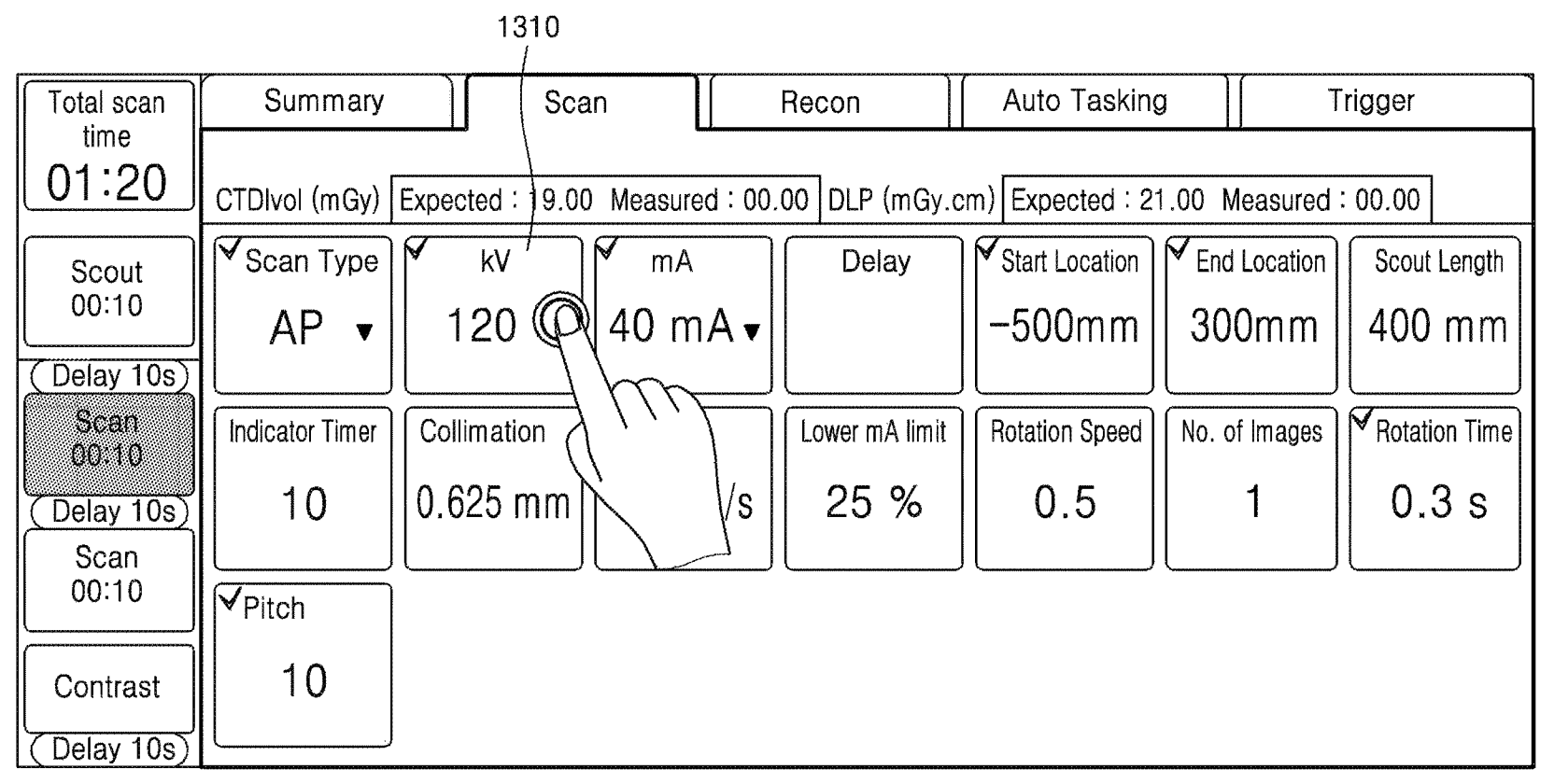
Figure 13B:
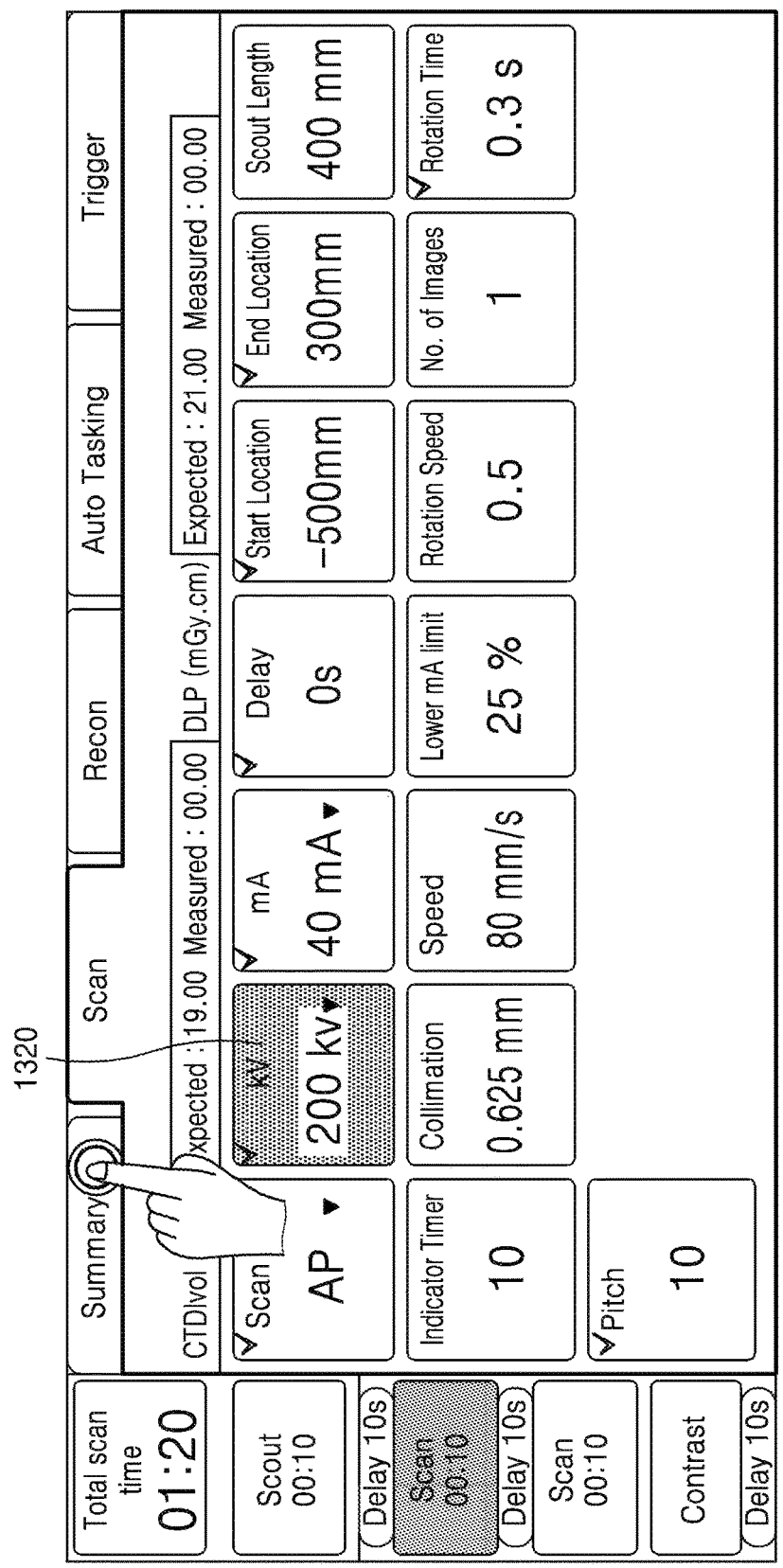

FIGS. 13A, 13B, and 13C are views which illustrate an operation of a medical imaging apparatus, according to an exemplary embodiment. In detail, FIGS. 13A, 13B, and 13C illustrate a UI image generated by a UI unit of the medical imaging apparatus receiving a fifth input which relates to changing the value of at least one parameter included in a second parameter set included in a second tab and a control unit of the medical imaging apparatus distinguishing the at least one parameter having changed value from a parameter having a value which has not been changed in the second parameter set.

Referring to FIG. 13A, a fifth input which relates to changing a kV parameter 1310 of a second parameter set corresponding to a first scan mode is illustrated. In detail, the fifth input involves changing the value of the kV parameter 1310 from 120 kV to 200 kV.

Referring to FIG. 13B, the kV parameter 1320 having a changed value is distinguished from a parameter for which a respective value has not been changed, in the second parameter set. For example, in FIG. 13B, the parameter 1320 for which the value has been changed is distinguished from the parameter for which a respective value has not been changed by using different respective colors.

Referring to FIG. 13C, the value of a parameter 1330 of the first parameter set that corresponds to the parameter 1320 for which the value has been changed is changed, and the parameter 1330 having the changed value is distinguished from a parameter for which a respective value has not been changed in the first parameter set. For example, in FIG. 13C, the parameter 1330 for which the value has been changed is distinguished from the parameter for which a respective value has not been changed by using different respective colors.

Figure 14A:
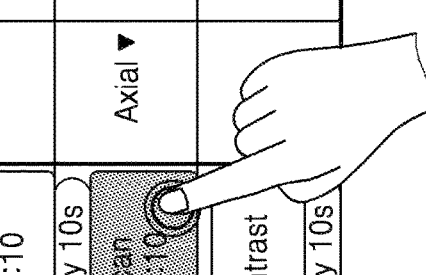
Figure 14B:
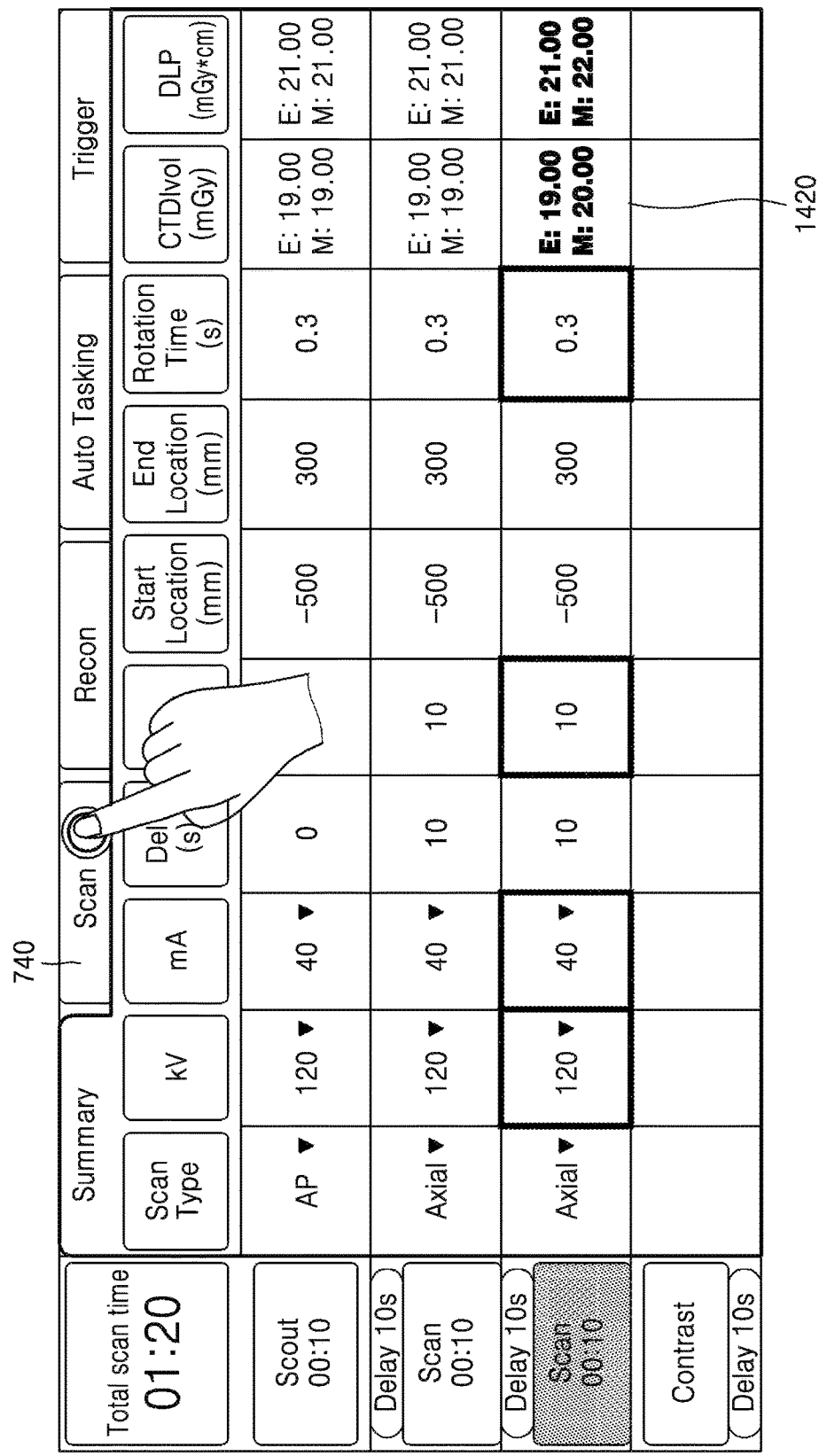

FIGS. 14A, 14B, and 14C are views which illustrate an operation of a medical imaging apparatus, according to an exemplary embodiment. According to an exemplary embodiment, at least one of a first tab and a second tab may include a measured value and an expected value of at least one of a radiation amount and a specific absorption rate generated during a medical image capturing operation in each of a plurality of imaging modes.

The control unit 620 may compare a measured value with an expected value, for each of the plurality of imaging modes. When the measured value exceeds the expected value, the control unit may control a notification signal which indicates a result of the comparison to be displayed. The display unit 630 may display a UI image which includes the notification signal. The medical imaging apparatus may further include the speaker 650 which is configured to output a notification sound which corresponds to the notification signal. The medical imaging apparatus 600 may further include a lamp or a buzzer that enables a user to recognize a notification signal. The control unit 620 may operate the lamp or the buzzer so that the user may visually or auditorily recognize that the measured value exceeds the expected value.

Referring to FIGS. 14A and 14B, a UI image which includes a first tab which includes a measured value and an expected value 1420 of a radiation amount generated during a CT scan is illustrated. The expected value is indicated by an "E:" notation and the measured value is indicated by an "M:" notation.

In detail, FIGS. 14A and 14B are regarding a case where a measured value of a radiation amount generated during a CT scan in the second scan mode 723 exceeds an expected value of the radiation amount. A measured value of a Computed Tomography Dose Index Volume (CTDIvol) of a radiation amount in a CT scan in the second scan mode is 20 mGy and exceeds an expected value of 19 mGy, and a measured value of a Dose Length Product (DLP) in the CT scan in the second scan mode is 22 mGy*cm and exceeds an expected value of 21 mGy*cm.

Thus, a control unit may control a display unit to display a UI image indicating that the measured value exceeds the expected value. For example, FIGS. 14A and 14B display the measured value and expected value 1420 of the radiation amount in the second scan mode in boldface.

In order to include a parameter set corresponding to the second scan mode in the second tab, FIG. 14A illustrates an exemplary embodiment of an input which relates to selecting the second scan mode from the plurality of imaging modes, and FIG. 14B illustrates an exemplary embodiment of an input which relates to selecting the second tab.

Referring to FIG. 14C, a UI image which includes the second tab which includes a measured value 1400 and an expected value 1410 of a radiation amount in a CT scan is illustrated.

The control unit 520 may compare a measured value with an expected value of a radiation amount in each of the plurality of imaging modes, and, when the measured value exceeds the expected value, the control unit 520 may control a UI image to be displayed such that a parameter which affects the measured value is distinguished from a parameter which does not affect the measured value in at least one of the first tab and the second tab.

Referring to FIGS. 14A, 14B, and 14C, boxes surrounding parameters which affect the measured value are outlined in bold, such that the parameters which affect the measured value are distinguished from parameters which do not affect the measured value.

In this case, the parameters that affect the measured value may be automatically determined by the control unit 520 or directly selected by a user.

As described above, a user of the medical imaging apparatus may safely capture a medical image by referring to expected values, measured values, and audio-visual notifications of a radiation amount and a specific absorption rate generated during the medical image capturing operation.

FIGS. 15A and 15B are views which illustrate an operation of a medical imaging apparatus, according to an exemplary embodiment. In detail, FIGS. 15A and 15B illustrate an exemplary embodiment in which at least one of a first tab and a second tab further includes at least one of slide bars 1510 and 1520 which relate to changing a tab image defined by a viewing area of the at least one tab, and in which a display unit displays a UI image which includes a tab image obtained based on a movement of a slide bar.

Referring to FIG. 15A, a first tab which includes the slide bar 1510 is illustrated. For example, a tab image that is defined by the viewing area may be changed based on an input which relates to moving the slide bar 1510 horizontally. Referring to FIG. 15B, a second tab which includes the slide bar 1520 is illustrated. For example, a tab image that is defined by the viewing area may be changed based on an input which relates to moving the slide bar 1520 vertically.

Figure 16:
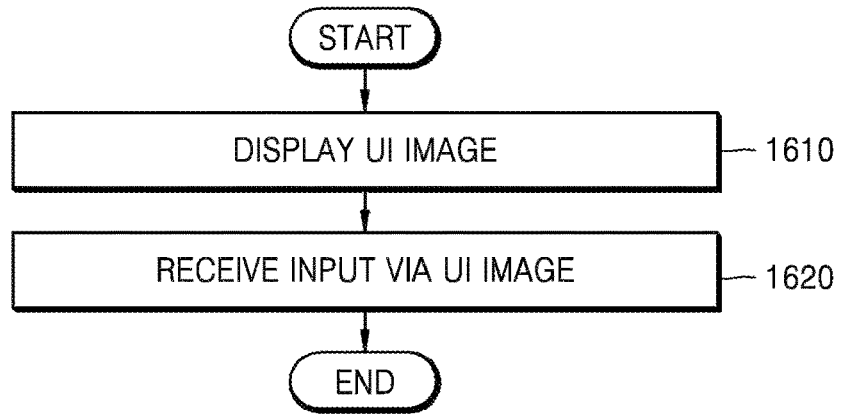
FIG. 16 is a flowchart of a method for displaying a UI image which is performable by a medical imaging apparatus, according to an exemplary embodiment.

FIG. 16 is a flowchart of a method for displaying a UI image by a medical imaging apparatus, according to an exemplary embodiment. The method for displaying a UI image may be performed by the medical imaging apparatuses 500 and 600 described above with reference to FIGS. 1-15B. Operations of the UI image displaying method include the same technical spirits as those of the above-described operations of the medical imaging apparatuses 500 and 600. A repeated description of matters described above with reference to FIGS. 1-15B is omitted herein.

In detail, referring to FIG. 16, in operation 1610, a UI image which includes a first tab which includes a plurality of first parameter sets which respectively correspond to a plurality of imaging modes and a second tab which includes a second parameter set which corresponds to an imaging mode selected from among the plurality of imaging modes is displayed by the medical imaging apparatus. The operation 1610 may be performed by the display unit 630 under the control of the control unit 620.

In operation 1620, an input is received via the UI image displayed in operation 1610. The operation 1620 may be performed by the UI unit 610.

Figure 17:
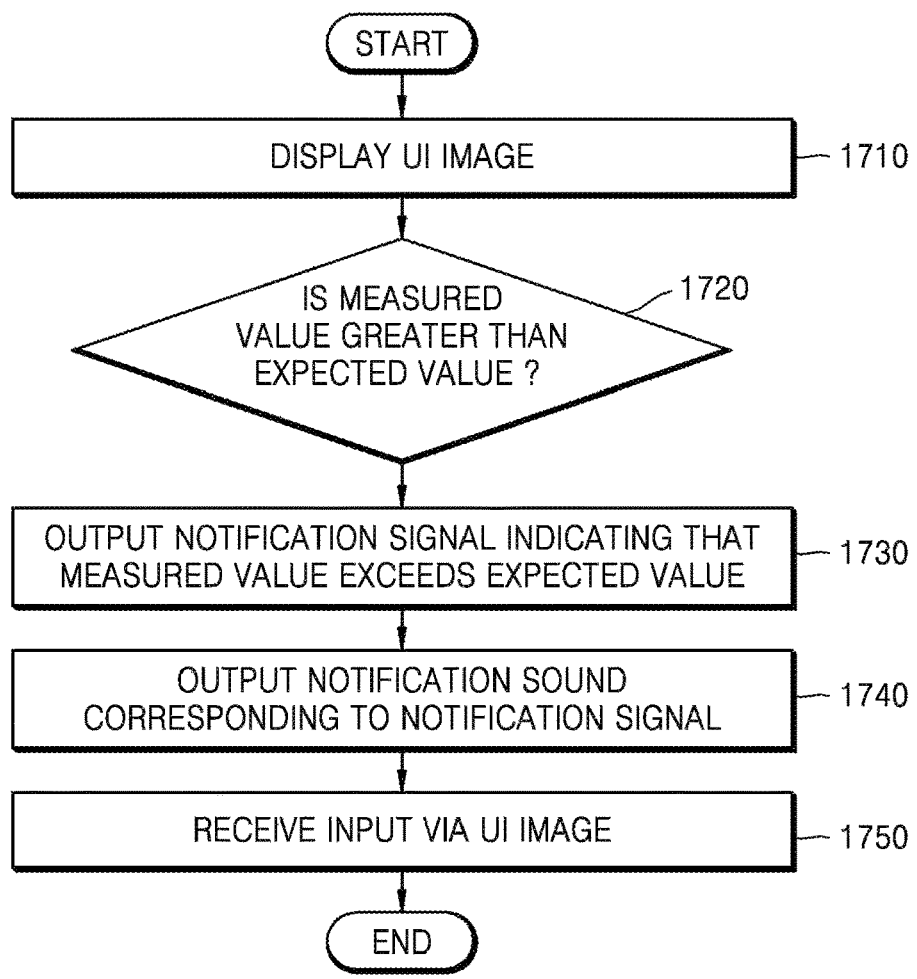
FIG. 17 is a flowchart of a method for displaying a UI image which is performable by a medical imaging apparatus, according to another exemplary embodiment.

FIG. 17 is a flowchart of a method for displaying a UI image which is performable by a medical imaging apparatus, according to another exemplary embodiment. The method for displaying a UI image may be performed by the medical imaging apparatuses 500 and 600 described above with reference to FIGS. 1-15B. Operations of the UI image displaying method include the same technical spirits as those of the above-described operations of the medical imaging apparatuses 500 and 600. A repeated description of matters described above with reference to FIGS. 1 through 15 is omitted herein.

In detail, referring to FIG. 17, in operation 1710, a UI image which includes a first tab which includes a plurality of first parameter sets which respectively correspond to a plurality of imaging modes and a second tab which includes a second parameter set which corresponds to an imaging mode selected from among the plurality of imaging modes is displayed by the medical imaging apparatus. The operation 1710 may be performed by the display unit 630 under the control of the control unit 620.

In operation 1720, a measured value and an expected value of at least one of a radiation amount and a specific absorption rate during a medical image capturing operation in each of a plurality of imaging modes are compared with each other. The operation 1720 may be performed by the control unit 620.

In operation 1730, if the measured value exceeds the expected value, a notification signal is output.

In operation 1740, a notification sound which corresponds to the notification signal is output. The operation 1740 may be performed by the speaker 650.

In operation 1750, an input is received via the UI image displayed in operation 1710. The operation 1750 may be performed by the UI unit 610. The input is a user input, and may be an input which relates to setting or changing imaging modes or respective parameters for the imaging modes that are displayed on the UI image.

As described above, in a medical imaging apparatus according to one or more exemplary embodiments and a UI image displaying method performed by the medical imaging apparatus, a UI image enabling a user to more conveniently capture a medical image is output. Accordingly, the convenience of users may increase.

The exemplary embodiments can be written as computer programs and can be implemented in general-use digital computers that execute the programs using a transitory or non-transitory computer readable recording medium.

Examples of the computer readable recording medium include magnetic storage media (e.g., ROM, floppy disks, hard disks, etc.), optical recording media (e.g., CD-ROMs, or DVDs), etc.

The exemplary embodiments should be considered in a descriptive sense only and not for purposes of limitation. Descriptions of features or aspects within each exemplary embodiment should typically be considered as available for other similar features or aspects in other exemplary embodiments.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A medical imaging apparatus comprising:
a controller configured to generate a user interface (UI) image;
a display configured to display the UI image; and
a UI device configured to receive an input which relates to the UI image,
wherein the UI image comprises a first tab which includes a plurality of first parameter sets which respectively correspond to a plurality of imaging modes, and a second tab which includes a second parameter set which corresponds to an imaging mode selected from among the plurality of imaging modes, and
wherein at least one of the first tab and the second tab further comprises a measured value of at least one of a radiation amount and a specific absorption rate generated during a medical image capturing operation in each of the plurality of imaging modes.

2. The medical imaging apparatus of claim 1, wherein the UI image comprises a menu image that includes at least the first tab and the second tab, and wherein the menu image is switchable between respective contents of at least the first tab and the second tab.

3. The medical imaging apparatus of claim 1, wherein
the UI device is further configured to receive a first input which relates to changing an arrangement of the plurality of first parameter sets within the first tab, and
the controller is further configured to generate the UI image by changing the arrangement of the plurality of first parameter sets based on the received first input.

4. The medical imaging apparatus of claim 1, wherein
the UI device is further configured to receive a second input which relates to changing a layout of the second parameter set within the second tab, and
the controller is further configured to generate the UI image by changing the layout of the second parameter set based on the received second input.

5. The medical imaging apparatus of claim 1, wherein
the UI device is further configured to receive a third input which relates to selecting at least one parameter from the second parameter set, and
the controller is further configured to generate the UI image by including the selected at least one parameter in the plurality of first parameter sets based on the received third input.

6. The medical imaging apparatus of claim 1, wherein
the UI device is further configured to receive a fourth input which relates to changing a value of at least one parameter included in the plurality of first parameter sets within the first tab, and
the controller is further configured to generate the UI image such that the at least one parameter having a changed value is distinguished from a parameter having a value which has not been changed in the plurality of first parameter sets based on the received fourth input.

7. The medical imaging apparatus of claim 6, wherein the controller is further configured to change a value of a parameter of the second parameter set that corresponds to the at least one parameter having a changed value, and to generate the UI image such that the parameter having a changed value in the second parameter set is distinguished from a parameter having a value which has not been changed in the second parameter set.

8. The medical imaging apparatus of claim 1, wherein
the UI device is further configured to receive a fifth input which relates to changing a value of at least one parameter included in the second parameter set within the second tab, and
the controller is further configured to generate the UI image such that the at least one parameter having a changed value in the second parameter set is distinguished from a parameter having a value which has not been changed in the second parameter set based on the received fifth input.

9. The medical imaging apparatus of claim 8, wherein the controller is further configured to change a value of a parameter of the plurality of first parameter sets that corresponds to the at least one parameter having a changed value in the second parameter set, and to generate the UI image such that the parameter having a changed value in the plurality of first parameter sets is distinguished from a parameter having a value which has not been changed in the plurality of first parameter sets.

10. The medical imaging apparatus of claim 1, wherein at least one of the first tab and the second tab further comprises an expected value of at least one of the radiation amount and the specific absorption rate generated during the medical image capturing operation in each of the plurality of imaging modes.

11. The medical imaging apparatus of claim 10, wherein the controller is further configured to compare the measured value with the expected value, and, when the measured value exceeds the expected value, to control the display to display a notification signal which indicates a corresponding amount of excess.

12. The medical imaging apparatus of claim 11, further comprising a speaker configured to output a notification sound which corresponds to the notification signal.

13. The medical imaging apparatus of claim 10, wherein for each of the plurality of imaging modes,
the controller is further configured to compare the measured value with the expected value, and
when the measured value exceeds the expected value, to control the display to display the UI image such that a parameter which affects the measured value is distinguished from a parameter which does not affect the measured value in at least one of the first tab and the second tab.

14. The medical imaging apparatus of claim 1, wherein in the UI image, changeable parameters of at least one of the first tab and the second tab are distinguished from unchangeable parameters based on the received input.

15. The medical imaging apparatus of claim 1, wherein the plurality of imaging modes comprises at least one of a computed tomography (CT) imaging mode which is classified based on at least one region of an object and a sub-imaging mode included in the CT imaging mode.

16. The medical imaging apparatus of claim 1, wherein the plurality of imaging modes comprises at least one of a magnetic resonance imaging (MRI) imaging mode which is classified based on at least one region of an object and a sub-imaging mode included in the MRI imaging mode.

17. The medical imaging apparatus of claim 1, wherein at least one parameter included in at least one of the plurality of first parameter sets and the second parameter set comprises a value which relates to adjusting or setting an image-capturing operation in each of the plurality of imaging modes.

18. The medical imaging apparatus of claim 1, wherein
at least one of the first tab and the second tab further comprises a slide bar which relates to changing a tab image defined by a viewing area of the at least one of the first tab and the second tab, and
the display is further configured to display the UI image so as to include a tab image which is obtained based on a movement of the slide bar.

19. A method for displaying a user interface (UI) image, the method being performable by a medical imaging apparatus, the method comprising:
displaying a UI image which includes a first tab which includes a plurality of first parameter sets which respectively correspond to a plurality of imaging modes, and a second tab which includes a second parameter set which corresponds to an imaging mode selected from among the plurality of imaging modes, via the medical imaging apparatus; and
receiving an input which relates to the UI image,
wherein at least one of the first tab and the second tab further comprises a measured value of at least one of a radiation amount and a specific absorption rate generate during a medical image capturing operation in each of the plurality of imaging modes.

20. The method of claim 19, wherein the UI image comprises a menu image that includes at least the first tab and the second tab, and wherein the menu image is switchable between respective contents of at least the first tab and the second tab.

21. The method of claim 19, wherein
the receiving the input comprises receiving a first input which relates to changing an arrangement of the plurality of first parameter sets within the first tab, and
the method further comprises generating the UI image by changing the arrangement of the plurality of first parameter sets based on the received first input.

22. The method of claim 19, wherein
the receiving the input comprises receiving a second input which relates to changing a layout of the second parameter set within the second tab, and
the method further comprises generating the UI image by changing the layout of the second parameter set based on the received second input.

23. The method of claim 19, wherein
the receiving the input comprises receiving a third input which relates to selecting at least one parameter from the second parameter set, and
the method further comprises generating the UI image by including the selected at least one parameter in the plurality of first parameter sets based on the received third input.

24. The method of claim 19, wherein
the receiving the input comprises receiving a fourth input which relates to changing a value of at least one parameter included in the plurality of first parameter sets within the first tab, and
the method further comprises generating the UI image such that the at least one parameter having a changed value is distinguished from a parameter having a value which has not been changed in the plurality of first parameter sets based on the received fourth input.

25. The method of claim 24, further comprising:
changing a value of a parameter of the second parameter set that corresponds to the at least one parameter having a changed value; and
generating the UI image such that the parameter having a changed value in the second parameter set is distinguished from a parameter having a value which has not been changed in the second parameter set.

26. The method of claim 19, wherein
the receiving the input comprises receiving a fifth input which relates to changing a value of at least one parameter included in the second parameter set within the second tab, and
the method further comprises generating the UI image such that the at least one parameter having a changed value in the second parameter set is distinguished from a parameter having a value which has not been changed in the second parameter set based on the received fifth input.

27. The method of claim 26, further comprising:
changing a value of a parameter of the plurality of first parameter sets that corresponds to the at least one parameter having a changed value in the second parameter set; and
generating the UI image such that the parameter having a changed value in the plurality of first parameter sets is distinguished from a parameter having a value which has not been changed in the plurality of first parameter sets.

28. The method of claim 19, wherein at least one of the first tab and the second tab further comprises an expected value of at least one of the radiation amount and the specific absorption rate generated during the medical image capturing operation in each of the plurality of imaging modes.

29. The method of claim 28, further comprising:
comparing the measured value with the expected value, for each of the plurality of imaging modes; and
when the measured value exceeds the expected value, displaying a notification signal which indicates a corresponding amount of excess.

30. The method of claim 29, further comprising outputting a notification sound which corresponds to the notification signal.

31. The method of claim 28, further comprising:
comparing the measured value with the expected value, for each of the plurality of imaging modes; and
when the measured value exceeds the expected value, displaying UI image such that a parameter which affects the measured value is distinguished from a parameter which does not affect the measured value in at least one of the first tab and the second tab.

32. The method of claim 19, further comprising displaying changeable parameters and unchangeable parameters of at least one of the first tab and the second tab such that the changeable parameters of the at least one of the first tab and the second tab are distinguished from the unchangeable parameters based on the received input.

33. The method of claim 19, wherein the plurality of imaging modes comprises at least one of a computed tomography (CT) imaging mode which is classified based on at least one region of an object and a sub-imaging mode included in the CT imaging mode.

34. The method of claim 19, wherein the plurality of imaging modes comprises at least one of a magnetic resonance imaging (MRI) imaging mode which is classified based on at least one region of an object and a sub-imaging mode included in the MRI imaging mode.

35. The method of claim 19, wherein at least one parameter included in at least one of the plurality of first parameter sets and the second parameter set comprises a value which relates to adjusting or setting an image capturing operation in each of the plurality of imaging modes.

36. The method of claim 19, wherein
at least one of the first tab and the second tab further comprises a slide bar which relates to changing a tab image defined by a viewing area of the at least one of the first tab and the second tab, and
the method further comprises displaying the UI image so as to include a tab image which is obtained based on a movement of the slide bar.

37. A non-transitory computer-readable recording medium having recorded thereon a program, which when executed by a computer, performs the method of claim 19.

* * * * *